US005983180A

United States Patent [19]
Robinson

[11] Patent Number: 5,983,180
[45] Date of Patent: Nov. 9, 1999

[54] RECOGNITION OF SEQUENTIAL DATA USING FINITE STATE SEQUENCE MODELS ORGANIZED IN A TREE STRUCTURE

[75] Inventor: Anthony John Robinson, Cambridge, United Kingdom

[73] Assignee: SoftSound Limited, Hertfordshire, United Kingdom

[21] Appl. No.: 09/031,881

[22] Filed: Feb. 27, 1998

[30]     Foreign Application Priority Data

Oct. 31, 1997 [GB] United Kingdom .................... 9723092
Jan. 13, 1998 [GB] United Kingdom .................... 9800658

[51] Int. Cl.⁶ ..................................................... G10L 5/06
[52] U.S. Cl. ........................................... 704/254; 704/256
[58] Field of Search .................................... 704/241–245, 704/254–257

[56]                    References Cited

U.S. PATENT DOCUMENTS

| | | | |
|---|---|---|---|
| 4,748,670 | 5/1988 | Bahl et al. ............................... | 704/256 |
| 5,033,087 | 7/1991 | Bahl et al. ............................... | 704/256 |
| 5,349,645 | 9/1994 | Zhao ...................................... | 704/243 |
| 5,621,859 | 4/1997 | Schwartz et al. ........................ | 704/256 |

FOREIGN PATENT DOCUMENTS

| | | | |
|---|---|---|---|
| 0627726 | 12/1994 | European Pat. Off. .......... | G10L 3/00 |
| 97/08686 | 3/1997 | WIPO .............................. | G10L 5/06 |

OTHER PUBLICATIONS

Douglas B. Paul, "An Efficient A* Stack Decoder Algorithm for Continuous Speech Recognition with a Stochastic Language Model," Int. Conf. on Acoust., Speech, and Sig. Proc., 1992, ICASSP–92, 23–25 Mar. 1992, vol. 1, pp. 125–128.

Patrick Kenny, Rene Hollan, Vishwa N. Gupta, Matthew Lennig, P. Mermelstein, and Douglas O'Shaughnessy, "A* –admissible Heuristics for Rapid Lexical Access," IEEE Trans. Speech and Audio Proc., Jan. 1993, vol. 1, iss. 1, pp. 49–58.

Tony Robinson and James Chrisitie, "Time–First Search for Large Vocabulary speech Recognition," Proc. 1998 IEEE Int. Conf. Acoust., Speech, and Sig. Proc., 1998, May 12–15, 1998, vol. 2, pp. 829–832.

Aubert, X., et al., "Large Vocabulary Continuous Speech Recognition of Wall Street Journal Data", *Proceedings of the IEEE International Conference on Acoustics, Speech, and Signal Processing, vol. 2*, 129–132, (1994).

(List continued on next page.)

*Primary Examiner*—David R. Hudspeth
*Assistant Examiner*—Donald L. Storm
*Attorney, Agent, or Firm*—Schwegan, Lundberg, Woessner & Kluth, P.A.

[57]                   ABSTRACT

In a method of automatically recognizing data which comprises sequential data units represented as sequential tokens grouped into one or more items, known items are stored as respective finite state sequence models. Each state corresponds to a token and the models which have common prefix states are organized in a tree structure such that suffix states comprise branches from common prefix states and there are a plurality of tree structures each having a different prefix state. Each sequential data unit is compared with stored reference data units identified by reference tokens to generate scores indicating the similarity of the data units to reference data units. An accumulated score for the final state in the models is determined by steps of (a) sequentially calculating the accumulated score for a model to reach the final state comprising a leaf in the tree, (b) identifying the closest branch to the leaf corresponding to a next model for which an accumulated score for the final stage has not yet been calculated, and (c) accumulating the score from the identified closest branch for the next model to the final state. These steps are repeated for the branches of the trees. The item corresponding to a model having the highest accumulated score is recognized as the model best matching the data.

48 Claims, 24 Drawing Sheets

OTHER PUBLICATIONS

Deller, Jr., J.R., et al., *Discrete–Time Processing of Speech Signals*, J. Griffin, ed., Macmillan Publishing Company, New York, table of contents, (1993).

Jelinek, F., "Up From Trigrams! The Struggle for Improved Language Models", *Proceedings of the European Conference on Speech Technology*, 1037–1040, (1991).

Katz, S.M., "Estimation of Probabilities From Sparse Data for the Language Model Component of a Speech Recognizer", *IEEE Transactions on Acoustics, Speech, and Signal Processing*, vol. ASSP–35, 400–401, (Mar. 1987).

Moyano, J.H., "Memory Efficient Search for Large Vocabulary Recognition", Thesis for MPhil in Computer Speech and Language Processing, Cambridge University, (Aug. 1997).

Rabiner, L., et al., *Fundamentals of Speech Recognition*, PTR Prentice–Hall, Inc., publisher, Englewood Cliffs, New Jersey, table of contents, (1993).

Rabiner, L.R., "A Tutorial on Hidden Markov Models and Selected Applications in Speech Recognition", *Proceedings of the IEEE*, vol. 77, 257–286, (Feb. 1989).

Renals, S., et al., "Decoder Technology for Connectionist Large Vocabulary Speech Recognition", Cambridge University Engineering Department Technical Report CS–95–17, 1–22 and appdx., (Sep. 1995).

Robinson, T., et al., "The Use of Recurrent Neural Networks in Continuous Speech Recognition", *Advanced Topics in Automatic Speech and Speaker Recognition*, C–H. Lee and F. K. Soong, eds., Kluwar Academic Publishers, 159–184 (Chap. 7), (1996).

Sedgewick, R., *Algorithms*, Second Edition, Addison–Wesley Publishing Company, Inc., table of contents, (1988).

Woodland, P., et al., "MPhil in Computer Speech and Language Processing, Introduction to Speech Recognition", *Course Notes, Cambridge University*, (1995).

THE UK PHONE TABLE

| Index | Label | Prior Prob | States | Self Prob | Exit Prob |
|---|---|---|---|---|---|
| 0 | sil | 0.245465 | 2 | 0.962093 | 0.037907 |
| 1 | aa | 0.010071 | 4 | 0.793464 | 0.206536 |
| 2 | ae | 0.018100 | 3 | 0.685999 | 0.314001 |
| 3 | ah | 0.010425 | 2 | 0.672734 | 0.327266 |
| 4 | ao | 0.015234 | 3 | 0.806572 | 0.193428 |
| 5 | aw | 0.006942 | 5 | 0.812548 | 0.187452 |
| 6 | ax | 0.031528 | 1 | 0.575526 | 0.424474 |
| 7 | ay | 0.019305 | 4 | 0.816049 | 0.183951 |
| 8 | b | 0.012664 | 2 | 0.736022 | 0.263978 |
| 9 | ch | 0.005645 | 4 | 0.799734 | 0.200266 |
| 10 | d | 0.024685 | 2 | 0.676253 | 0.323747 |
| 11 | dh | 0.013200 | 2 | 0.636416 | 0.363584 |
| 12 | ea | 0.003347 | 4 | 0.784454 | 0.215546 |
| 13 | eh | 0.019588 | 2 | 0.727464 | 0.272536 |
| 14 | er | 0.008581 | 3 | 0.793586 | 0.206414 |
| 15 | ey | 0.020591 | 4 | 0.780678 | 0.219322 |
| 16 | f | 0.019466 | 3 | 0.791641 | 0.208359 |
| 17 | g | 0.006521 | 3 | 0.705886 | 0.294114 |
| 18 | hh | 0.009754 | 3 | 0.720935 | 0.279065 |
| 19 | ia | 0.006217 | 4 | 0.784366 | 0.215634 |
| 20 | ih | 0.042714 | 2 | 0.553121 | 0.446879 |
| 21 | iy | 0.015609 | 3 | 0.754161 | 0.245839 |
| 22 | jh | 0.006812 | 3 | 0.797496 | 0.202504 |
| 23 | k | 0.034631 | 3 | 0.747047 | 0.252953 |
| 24 | l | 0.026959 | 2 | 0.692925 | 0.307075 |
| 25 | m | 0.019791 | 2 | 0.710660 | 0.289340 |

FIG. 12

THE UK PHONE TABLE

| Index | Label | Prior Prob | States | Self Prob | Exit Prob |
|---|---|---|---|---|---|
| 26 | n | 0.048768 | 2 | 0.673438 | 0.326562 |
| 27 | ng | 0.009110 | 3 | 0.756703 | 0.243297 |
| 28 | oh | 0.012692 | 2 | 0.720420 | 0.279580 |
| 29 | ow | 0.013108 | 3 | 0.780115 | 0.219885 |
| 30 | oy | 0.002564 | 4 | 0.814678 | 0.185322 |
| 31 | p | 0.023534 | 3 | 0.762761 | 0.237239 |
| 32 | r | 0.022903 | 2 | 0.653108 | 0.346892 |
| 33 | s | 0.059022 | 3 | 0.791900 | 0.208100 |
| 34 | sh | 0.014548 | 4 | 0.835223 | 0.164777 |
| 35 | t | 0.053775 | 2 | 0.726768 | 0.273232 |
| 36 | th | 0.005125 | 4 | 0.758090 | 0.241910 |
| 37 | ua | 0.001254 | 3 | 0.725984 | 0.274016 |
| 38 | uh | 0.001666 | 2 | 0.530494 | 0.469506 |
| 39 | uw | 0.010664 | 3 | 0.722600 | 0.277400 |
| 40 | v | 0.013320 | 2 | 0.709686 | 0.290314 |
| 41 | w | 0.011328 | 2 | 0.742258 | 0.257742 |
| 42 | y | 0.009147 | 3 | 0.741241 | 0.258759 |
| 43 | z | 0.032797 | 3 | 0.755206 | 0.244794 |
| 44 | zh | 0.000832 | 4 | 0.751965 | 0.248035 |

FIG. 12 (Continued)

THE PROCESS NODE SUBROUTE

RECOGNITION OF SEQUENTIAL DATA USING FINITE STATE SEQUENCE MODELS ORGANIZED IN A TREE STRUCTURE

The present invention generally relates to a recognition method and apparatus for recognising data comprising sequential data units represented by sequential tokens grouped into one or more items. In an exemplary embodiment the present invention is applied to speech recognition.

Systems for recognising sequences of data units represented as sequential tokens which can be grouped into one or more items attempt to recognise items within the data by matching groups of tokens to a pre-stored dictionary of sequences of tokens representing known items. Once a match has been found and thus the input data recognised, an appropriate output can be generated. Typically for speech recognition this output can take the form of a command to instruct apparatus to carry out a function, or it can be translated into text for input into an application such as a word processor.

FIG. 1 illustrates a typical apparatus used for speech recognition. A computer 1 has a keyboard 3 and is interfaced via an input/output device 11 to a microphone 7 and a loudspeaker 5. A speech signal is detected by the microphone 7 and input to the computer 1 whereupon a program operates to recognise the speech in order to at least one of control the computer, and generate an acoustic output at the loudspeaker 5. The loudspeaker 5 can also be used to play back the speech signal if this is digitally recorded. The computer 1 is operated under the control of a program which can be loaded using a computer storage medium such as a floppy disc 13 or any other type of computer storage medium such an optical disc, magnetic tape, or programmable memory devices.

There are many different methods for carrying out speech recognition and many techniques are based on probabilistic finite state sequence models known as hidden Markov models (HMMs). A Markov chain comprises a plurality of states wherein a transition probability is defined for each transition from state to every other state and a self transition probability is defined for transitions from a state to itself. FIG. 2 illustrates a hidden Markov model for the phonetic sequence ae, b, ax and t for the pronunciation of ABBOT. As can be seen there are four sequential states which form the hidden Markov model for the word and there are six observations O(1) to O(6) which correspond to six sequential data units representing extracted portions of speech. Since the hidden Markov model can undergo self transitions, the transition along the hidden Markov model need not be, and indeed is rarely, synchronous with the observed portions of speech. As can be seen in FIG. 2 self transitions occur in the ae state and the ax state corresponding to the longer duration of the pronunciation of these phonemes.

FIG. 3 illustrates more clearly the relationship between the HMM states and time. Each of the transitions from a state to another state and the self transition within a state has associated with it a probability. Also, there is a probability that the observation corresponds with an HMM state. Thus in order to determine the most likely match between the sequence of observations and an HMM model for a word it is necessary to calculate an accumulated probability in a final state of the HMM model. The accumulated probability in a final state can be calculated by summing log probabilities or by multiplying the probabilities. In a system with more than one word model, the word having the highest accumulated probability can then be identified as the most likely spoken word corresponding to the speech data.

A prior art method for calculating the accumulated probability for each HMM model is the Viterbi method which is described in detail, together with an application of HMMs to speech recognition in a paper entitled "A Tutorial on Hidden Markov Models and Selected Applications in Speech Recognition" by L. R. Rabiner (Proceedings of the IEEE, Vol. 77, No. 2, February 1989, pages 257–286). In implementing the Viterbi algorithm, all of the prior art methods calculate the accumulated probabilities for all of the HMM states for all of the models time sequentially. Thus as can be seen in FIG. 3, where the numbers under each state indicate the order calculation of the accumulated probability for each state, for each observation (O(1) to O(6)) i.e. for each input portion of speech a probability of the portion of speech, matching each phoneme (HMM state) is generated and used to sequentially determine the probability for each HMM state of each model. This is then repeated for each observation until an accumulated probability is determined for the final HMM state in step 24. Thus, as can be seen in FIG. 4 which illustrates a set of HMM models for a part of a dictionary, using the Viterbi method it is necessary for the accumulated probability for the first temporal state for each of the HMM states of all of the models to be stored. In fact, two temporal levels of HMM states are stored since the accumulated probabilities of the HMM states in the current time period must be calculated based on the probabilities of the HMM states in the previous time period. For a small dictionary this does not present a problem. However, for large dictionary speech recognition e.g. 65,000 words, a large memory is required for the calculation of the probabilities.

As can be seen in FIG. 4, the calculation of the accumulated probability at many of the HMM states represents a duplication. This has been recognised in the prior art and in order to avoid this repetition the plurality of HMM models has been organised into a tree structure (U.S. Pat. No. 5,621,859). FIG. 5 illustrates how the HMM models of FIG. 4 can be rearranged in such a tree structure. As can be seen this reduces the memory requirement for the search space in order to accumulate the probabilities.

The prior art method utilising the tree structure of FIG. 5 however still require all of the probabilities for the tree structure to be stored in memory. And thus whilst there is a memory saving compared to the use of a complete set of HMM models arranged linearly, it is desirable to still further reduce the memory requirements for the search space to calculate the accumulated probabilities and it is to the solution of this problem that one aspect of the present invention is directed.

There are two types of speech recognition. Discrete speech recognition constrains the speaker to pause between each word to thereby provide discretely spoken words for recognition. Such systems are now being superseded however with systems capable of recognising natural speech i.e. continuous speech wherein a speaker is not constrained to pause between each spoken word. The problem with such a system is that spoken words tend to merge together and the boundaries between words are often indefinite. Thus, the transition between HMM models is not defined by a single transition from a final state but instead can comprise multiple transitions as illustrated in FIG. 6. As can be seen in FIG. 6 there are four possible transitions from a previous word ending in t to a succeeding word ABBEY comprising the phonemes ae, b, and iy. Thus, for continuous speech recognition it is necessary for such transitions to be taken into account.

In speech recognition, in order to improve the accuracy of the recognition, not only are models for the words used, but also a language model is used to provide models indicating the probability of the occurrence of sequences of words. Typically an N-gram is used wherein the accumulated probability to the final state is modified in dependence upon one or more previous words. Thus, for instance in a bigram model for general English, there is a higher probability of the word CAT following the word THE than the word THE following the word THE. These probabilities can be used to modify the accumulated probability in the final HMM state. In order to do this however the accumulated probability for each HMM model is used as an initial probability for one or more initial HMM states in a preceding word. This may be achieved using stack decoding as for example disclosed in U.S. Pat. No. 4,748,670.

It is an object of a second aspect of the present invention to provide a more efficient recognition method for use in for example continuous speech recognition to reduce the computational requirements.

In accordance with the first aspect the present invention provides a method of automatically recognising data comprising sequential data units represented as sequential tokens grouped into one or more items, the method comprising the steps of:

storing data representing known items as respective finite state sequence models, where each state corresponds to a token and said models having common prefix states are organised in a tree structure such that suffix states comprise branches from common prefix states and there are a plurality of tree structures each having a different prefix state;

comparing each sequential data unit with stored reference data units identified by respective reference tokens to generate scores for each data unit indicating the similarity of the data unit to respective said reference data units;

determining an accumulated score for the final state in the models by
a) sequentially calculating the accumulated score for a model to reach the final state comprising a leaf in the tree,
b) identifying the closest branch to the leaf corresponding to a next model for which an accumulated score for the final state has not yet been calculated,
c) accumulating the score from the identified closest branch for the next model to the final state,
d) repeating steps (b) and (c) for the branches of the tree, and
e) repeating steps (a) to (d) for the plurality of trees; and
identifying at least the item corresponding to the model having the highest accumulated score.

Also, in accordance with this aspect of the present invention there is provided recognition apparatus for recognising sequential tokens grouped into one or more items, the apparatus comprising:

storage means for storing data representing known items as respective finite state sequence models, where each state corresponds to a token and said models having common prefix states are organised in a tree structure such that suffix states comprise branches from common prefix states and there are a plurality of tree structures each having a different prefix state;

comparing means for comparing each sequential data unit with stored reference data units identified by respective reference tokens to generate scores for each data unit indicating the similarity of the data unit to respective said reference data units;

determining means for determining an accumulated score for the final state in the models comprising
a) means for sequentially calculating the accumulated score for a model to reach the final state comprising a leaf in the tree
b) means for identifying the closest branch to the leaf corresponding to a next model for which an accumulated score for the final state has not yet been calculated, and
c) means for accumulating the score from the identified closest branch for the next model to the final state, wherein the scores are accumulated for the branches of the tree and accumulated for the plurality of trees; and means for identifying at least the item corresponding to the model having the highest accumulated score.

The present invention can be implemented using dynamic programming to determine the most likely state sequences or the most likely word sequences, i.e. the maximum accumulated score is calculated or within a word the score for all possible state sequences can be summed to calculate what is termed the forward probability (see page 335 of "Fundamentals of Speech Recognition" by L. Robiner and B. Juang, Prentice Hall, 1993).

In a preferred embodiment of the present invention each state of the hidden Markov model corresponds to a token. The present invention is however not limited to such a direct comparison and more than one HMM state may correspond to a token.

Thus instead of calculating the accumulated probabilities for all of the states in a time instance i.e. time synchronously in accordance with prior art methods of implementing the Viterbi algorithm, the accumulated probabilities for each state are calculated for nodes of a tree until a final state of a model is reached which may or may not be a leaf node of the tree, i.e. state sequentially down branches of the trees. Once the accumulated probability at the final state has been determined, the memory space during the accumulated probabilities for the nodes of the tree back to the nearest branch for which an accumulated probability for a model has still to be calculated is freed for use in the calculation of the accumulated probabilities down the next branch. In this way the amount of memory required is reduced. The memory requirement depends on the number of states in the longest hidden Markov model, and the number of observations. In contrast the time synchronous implementation of the Viterbi algorithm requires a memory capacity equivalent to the average number of states in the hidden Markov model times the number of hidden Markov models. The comparing step can comprise any method of generating probabilities for each data unit indicating the likelihood of the data unit being represented by a particular token.

In an embodiment each token is modelled as an HMM where each state of the HMM corresponds to a subdata unit. Comparison step then comprises determining accumulated probabilities for each data unit using the respective HMM.

In order to reduce the calculations a pruning step is used to halt the accumulation of scores for any branches where the accumulated score falls below a threshold. Such a threshold can be an absolute threshold although in a preferred embodiment the threshold is relative to the highest accumulated score. Such a technique is termed "beam pruning".

In accordance with the present invention the tokens can represent any form of sequential data units which occur in one or more groups corresponding to items. The tokens comprise a finite set of tokens where each token appears in more than one item. An example of such is speech recognition wherein speech data comprises parts of speech e.g. phonemes or syllables which occur sequentially and are grouped into one or more words.

Each token can be independent of preceding and succeeding tokens. For example in speech recognition it can be assumed that there are a set of parts of speech e.g. phonemes which are not modified by the preceding or succeeding part of speech. Alternatively, the tokens can depend on neighbouring tokens in the finite state sequence e.g. in speech recognition context dependent phone models can be used to generate phoneme probabilities.

Since the probabilities of the states of the hidden Markov model are calculated for each state sequentially, the HMM states can be considered to have temporal states corresponding to each data unit e.g. each time frame. However, the present invention is not limited to the recognition of time sequential data and can recognise any data once it is presented to the system sequentially. The accumulation of the score for the final state in the models is calculated by calculating the accumulated score for the temporal states for a state in a timewise manner before calculating the temporal states for the next state in a timewise manner. This makes it possible for each branch of the lexical tree in a speech recognition system to be calculated one at a time reusing the common suffix phonemes by releasing the memory for HMM states of the previous model.

In an embodiment of the present invention the accumulated scores for the temporal states for a final state of a model of an item are stored as a group in a memory together with information identifying a grouping model state used to arrive at the final state, information identifying positions in the tree structure and information identifying the temporal position of the accumulated scores. A previously stored group of accumulated scores is then read from memory and the accumulated scores for the plurality of temporal states is used as a plurality of temporally different initial scores for the calculation of the accumulated scores for the plurality of temporal states in the final state of a model of a subsequent item. The grouping model state used to arrive at the final state of the model of the subsequent item is determined from the identification of the subsequent item and the grouping model state of the read group of accumulated scores.

This embodiment of the present invention reduces the calculations required for continuous speech recognition when there is an overlap between the final states and initial states of neighbouring words i.e. the boundary between two spoken words is not sharply defined. In this embodiment for speech recognition the group model state comprises a language model state which for an N-gram model comprises N−1 words.

A store for each of the grouping model states can be stored to indicate the likelihood of items being sequentially grouped based on a grouping model of likely item sequences. In order to take into account a likelihood of sequences of items, the accumulated scores for the plurality of temporal states for the final state of a model of an item can be modified by the score for the grouping model state before being stored. Thus for the speech recognition system an N-gram language model can be used to give the probability of word sequences.

The memory means in which the groups of accumulated scores are stored comprises a stack in which the groups are ordered temporally or by their scores. In this way groups of accumulated scores for grouping model states can be pushed onto and popped off a stack as groups.

In an embodiment of the present invention it can be determined if a grouping model state is already stored in the memory means and if so the calculated accumulated scores for a final state of a model of an item and associated information is merged with the stored group of accumulated scores and associated information in temporal alignment whereby if there is temporal overlap between accumulated scores the highest accumulated score is stored in the memory means together with respective associated information.

In accordance with a second aspect of the present invention there is provided a method of automatically recognising data comprising sequential data units represented as sequential tokens grouped into a plurality of items, the method comprising the steps of:

storing data representing known items as respective finite state sequence models where each state corresponds to a token and each state comprises a plurality of temporal states corresponding in time to the sequence of tokens;

comparing each sequential data unit with stored reference data units identified by respective reference tokens to generate scores for each data unit indicating the similarity of the data unit to respective said reference data units;

determining accumulated scores for a plurality of temporal states for a final state in the models by accumulating scores for a plurality of temporal states for each state in the model;

storing the accumulated scores for the final state of a model as a group together with information identifying the temporal position of the accumulated scores and information identifying a grouping model state used to arrive at the final state;

reading a previously stored group of accumulated scores;

using said accumulated scores for the plurality of temporal states as a plurality of temporally different initial scores for the calculation of the accumulated scores for the plurality of temporal states of a final state of a model of a subsequent item; and determining the group model state used to arrive at the final state of the model of the subsequent item from the known identity of the subsequent item corresponding to the model and the group model state of the read group of accumulated scores.

In accordance with another aspect of the present invention there is provided recognition apparatus for recognising sequential tokens grouped into a plurality of items, the apparatus comprising:

first storage means for storing data representing known items as respective finite state sequence models, where each state corresponds to a token, and each state comprises a plurality of temporal states corresponding in time to the sequence of tokens;

comparing means for comparing each sequential data unit with stored reference data units identified by respective reference tokens to generate scores for each data unit indicating the similarity of the data unit to respective said reference data units;

determining means for determining accumulated scores for a plurality of temporal states for a final state in the models by accumulating scores for a plurality of temporal states for each state in the model;

second storage means for storing the accumulated scores for the final state of a model as a group together with information identifying the temporal position of the accumulated scores and information identifying a group model state used to arrive at the final state;

reading means for reading a previously stored group of accumulated scores;

wherein said determining means is adapted to use said accumulated scores for the plurality of temporal states as a plurality of temporally different initial scores for the calculation of the accumulated scores for the plurality of temporal states of a final state of a model of a subsequent item; and the apparatus includes group model state determining means for determining the group model state used to arrive at the final state of the model of the subsequent item from the known identity of the subsequent item corresponding to the model and the group model state of the read group of accumulated scores.

In accordance with this aspect of the present invention by grouping the accumulated scores in the memory means they can be read out for use as initial probabilities for the calculation of accumulated probabilities for the final states in a new language model state and thus the computational arrangement is more efficient.

Although this aspect of the present invention is preferably used in conjunction with the previous aspect of the present invention i.e. a tree structured item dictionary or lexicon and calculations of the accumulated probabilities in a statewise manner, this aspect of the present invention can also be used in conjunction with the prior art time synchronous method. In such an arrangement it may be more convenient to arrange each of the groups of accumulated probabilities as a linked list since in a time sequential algorithm the number of accumulated probabilities in a group will not be known at the start i.e. when the first accumulated probability is entered in the memory for the grouping model state. Since the length of the string of accumulated probabilities is not known, the amount of memory required for the group is not known and thus the linked list or equivalent storage method is more memory efficient.

Embodiments of the present invention will now be described with reference to the accompanying drawings in which:

FIG. 12 illustrates the phone table used in FIG. 11;

Figure 1:
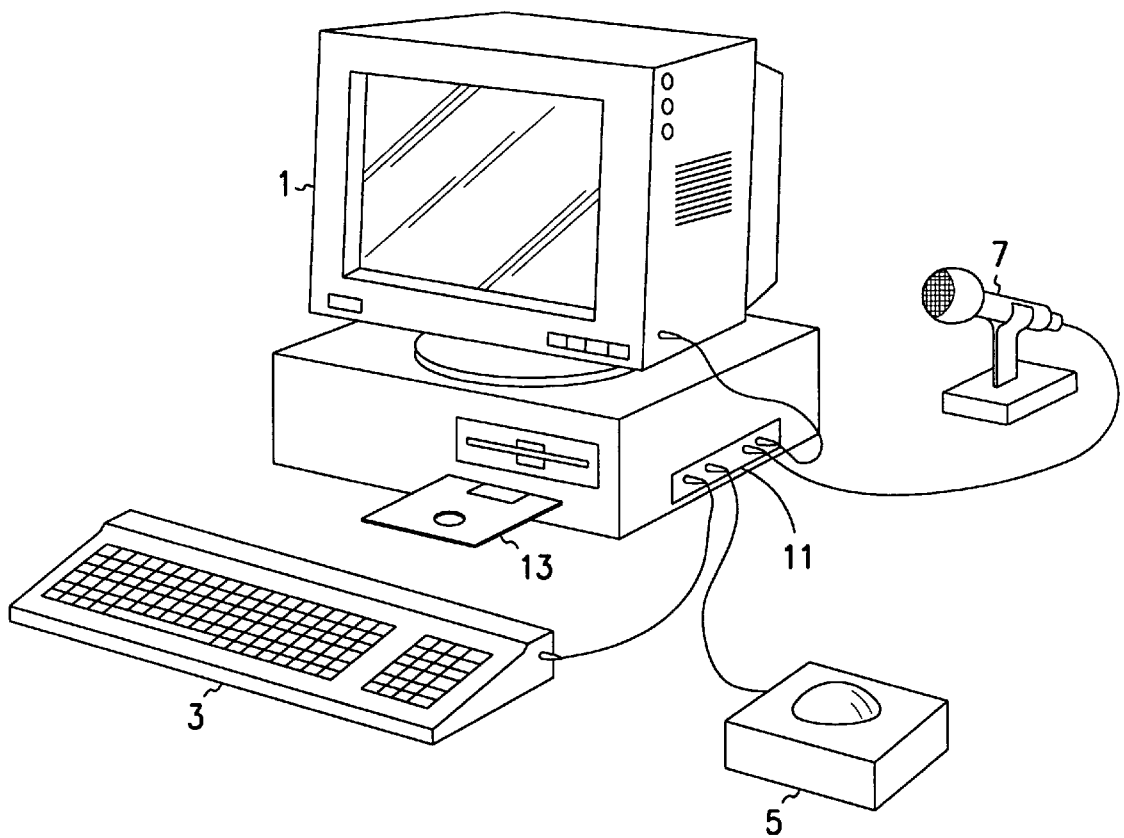
FIG. 1 is an overview of a speech recognition system.

An embodiment of the present invention will now be described with reference to speech recognition. It will be understood by a skilled person in the art that the present invention is not limited to the field of speech recognition and is applicable to any field of data recognition having data structure similar to speech i.e. having sequential data units representable as a sequence of tokens forming one or more sequential items, where there is a large dictionary of possible items modelled as finite state sequence models. The general system for speech recognition can be the same as the prior art as illustrated with regard with FIG. 1. More specifically the structure according to an embodiment of the present invention is illustrated with regard to FIG. 7. Speech signals are detected by a microphone 21 and digitised by a digitiser 22. Typically the speech signal is sampled at 16 kHz and digitised using 16 bits per sample. The digitised signal is then passed to the acoustic processor 23 wherein the signal is split into overlapping frames where it assumed that the signal is stationary within a frame. Typically the frame length is about 25 ms and the frame advance is about 10 ms. This frame i.e. extracted portion of speech is then parameterised to yield acoustic features typically as an acoustic vector. Typically the dimensionality of the acoustic vector is about 13 and it represents the power spectral density in the frame or some variation of it. The acoustic vectors could be formed using any known technique to generate for example the mel frequency cepstral coefficients and perceptual linear prediction coefficients.

The acoustic features must then be matched by the phoneme probability calculator 25 to the acoustic models 24 in order to generate probabilities of the match between the acoustic features and each of the acoustic models 24. In this embodiment of the present invention the acoustic models comprise models representing the 45 phonemes of the UK English language. Thus the phoneme probability calculator generates 45 probabilities, one per phoneme for each input set of acoustic features i.e. for each part of speech.

Thus the purpose of the acoustic models is to relate the acoustic observations to linguistic states such as phonemes or parts of phonemes. This is done on a local time scale giving the probability of seeing an acoustic vector, O(t) at time (t) given the state, S(t), is i, which is written p(O(t)|S(t)=i).

Several parametric models may be used to approximate this function. One such model is a mixture of Gaussians:

$$p(O(t)|S(t)=i) = \sum_j \frac{c_{ij}}{(2\pi)^{d/2}\sqrt{|\Sigma_{ij}|}} \exp\left(-\frac{1}{2}(O(t)-\mu_{ij})^T \Sigma_{ij}^{-1}(O(t)-\mu_{ij})\right) \quad (1)$$

where $c_{ij}$ is the mixture weight associated with the $j^{th}$ Gaussian of state i, $\mu_{ij}$ is the mean and $\Sigma_{ij}$ is the covariance matrix associated with this Gaussian.

Neural networks may also be used. In this case they approximate the probability Pr(S(t)=i|O(t)). The two quantities are related by:

$$p(O(t)|S(t)=i) = \frac{Pr(S(t)=i|O(t))p(O(t))}{Pr(S(t)=i)} \quad (2)$$

The term p(O(t)) is independent of the state and so is the same whatever string of words is recognised. Hence it may be ignored and the quantity $$\frac{Pr(S(t)=i|O(t))}{Pr(S(t)=i)} \quad (3)$$

is used.

In this embodiment of the present invention phonemes are used since they are the basic building block of large vocabulary speech recognition. The pronunciation of each word is specified as a sequence of phonemes, in much the same way as found in many dictionaries. Speech recognition requires a model, or template for each word to be recognised. The advantages of building these word models out of phoneme models are that there are many fewer models in total and that new words may be added easily to the system by specifying their phoneme sequence. It is however not the only way to perform large vocabulary recognition.

If the acoustic vectors that correspond to a particular phoneme are examined it is seen that there is similarity between different utterances of the same phoneme, but also there is significant variation depending on speaker, context and other factors. Hence the process of recognising phonemes is not a deterministic one and is best suited to probabilistic models.

Figure 7:
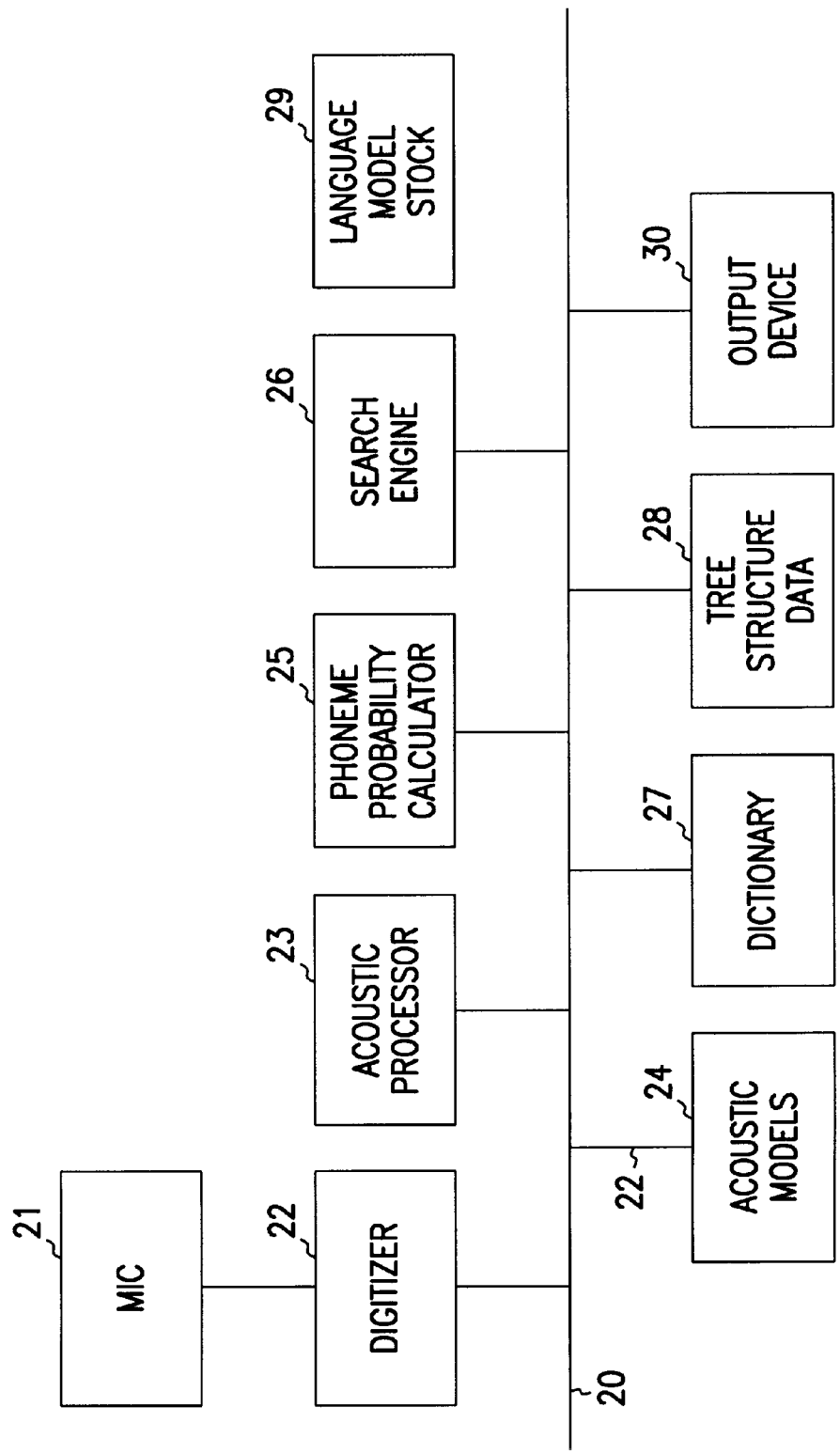
FIG. 7 is a schematic diagram of the system in accordance with an embodiment of the present invention.

The search engine in 26 in FIG. 7 will determine accumulated probabilities for hidden Markov model states using dictionary information 27 and tree structure data 28. Also to improve recognition using a language model, a language model stack or heap 29 is provided to store groups of accumulated probabilities. Once the words have been recognised they can be output using the output device 30. The output device can output the recognised words in the form of commands or in the form of text data for input to a computer application such as a word processor.

The details of the algorithm used to recognise a word from the input sequence of phonemes will now be described.

A dictionary stores a word model for a plurality of words: each word model being composed of a sequence of phoneme models according to a pronunciation dictionary. Table 1 below illustrates part of a dictionary.

TABLE 1

| | |
|---|---|
| A | ah |
| A | ey |
| A'S | ey z |
| ABANDON | ax b ae n d ax n |
| ABANDONED | ax b ae n d ax n d |
| ABANDONING | ax b ae n d ax n ih ng |
| ABANDONMENT | ax b ae n d ax n m ax n t |
| ABBEY | ae b iy |
| ABBOT | ae b ax t |

Figure 2:
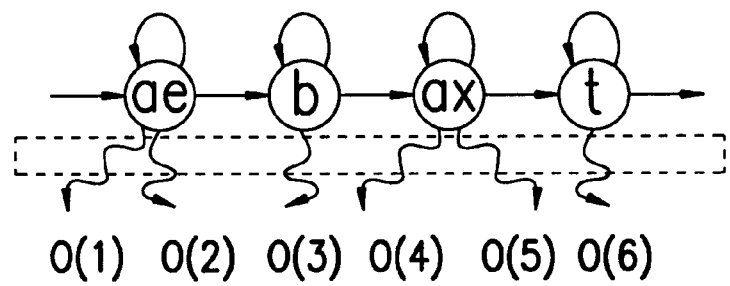
FIG. 2 is a schematic diagram of a left to right hidden Markov model for the word ABBOT.

FIG. 2 shows the hidden Markov model for a single word ABBOT. It is composed of the phones ae, b, ax and t and for simplicity these are illustrated as single state phoneme models. The present invention is not however limited to use of single state phoneme models and as will be described hereinafter any number of state phoneme models can be used. As is conventional, O(t) represents the observations in time t, $b_i(O(t))$ represents the likelihood of observing O(t) given that it came from state i and $a_{ij}$ represents the probability of transition from state i to state j. The dynamic programming search for the most likely state sequence can be expressed as finding the maximum sum of log emission and log transition probabilities and this is the known Viterbi algorithm. The initialisation and condition specifies that only the first state is valid at the start:

$$\phi_i(0) = \begin{cases} 0 & i=0 \\ -\infty & i>0 \end{cases} \quad (4)$$

and at every subsequent (j,t) the most probable path is chosen:

$$\phi_j(t) = {}^{max}{}_i(\phi_i(t-1)+\log a_{ij})+\log b_j(O(t)) \quad (5)$$

Figure 3:
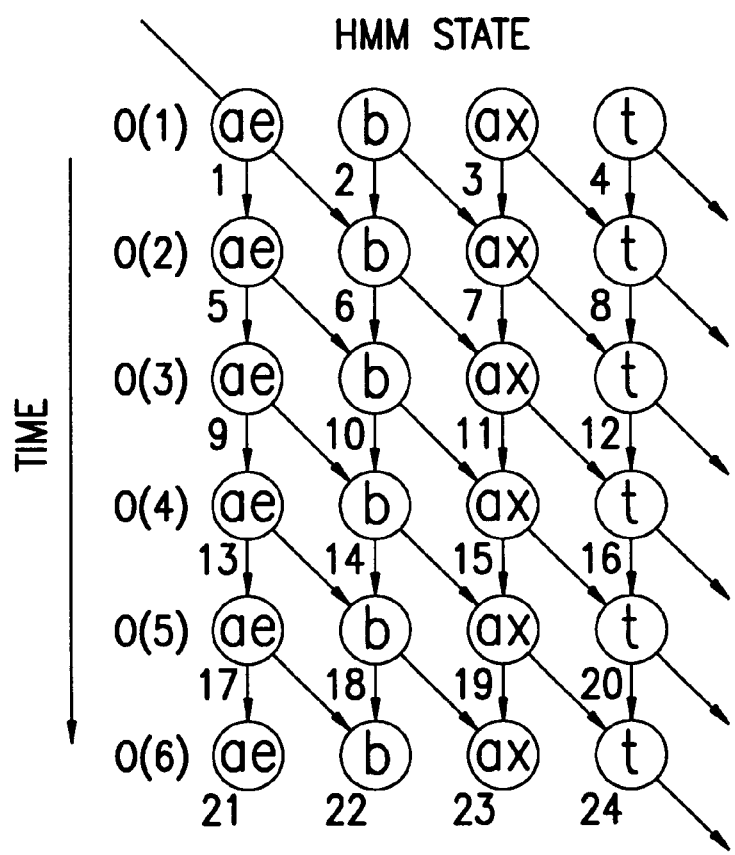
FIG. 3 is a diagram of hidden Markov model states for the word ABBOT with respect to time showing self transitions.
Figure 4:
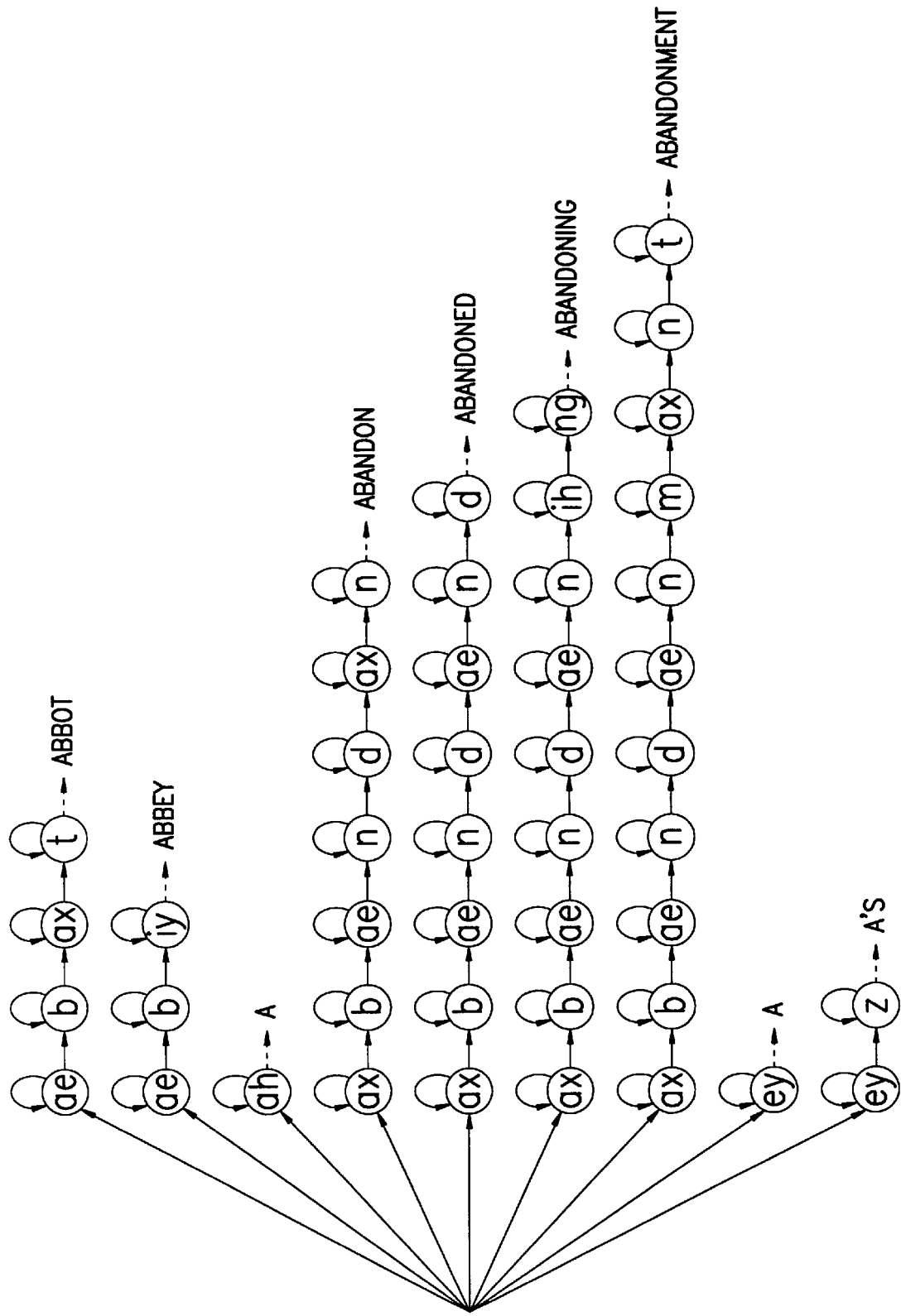
FIG. 4 is a schematic diagram of part of a lexicon of hidden Markov models for words arranged sequentially.

Conventionally the search for the most probable state sequence precedes time synchronously. This is illustrated in FIG. 3 where the values of $\phi_j(t)$ are computed in the numbered sequence. It should be noted that the states labelled 2, 3, 4, 7, 8 and 12 are not accessible and therefore may be explicitly excluded from the search. Similarly states 13, 17, 18, 21, 22 and 23 can never be in the best path and may also be excluded. The global best path is determined by tracing back the best transitions from the end to the start and these are shown in bold. This process is repeated for each word in the vocabulary and the most probable match is chosen as the recognised word. However, instead of performing the search as:

for t=1 to T
  for j=1 to N $$\phi_j(t) = \max_i(\phi_i(t-1)+\log a_{ij})+\log b_j(O(t)) \quad (6)$$

Figure 8:
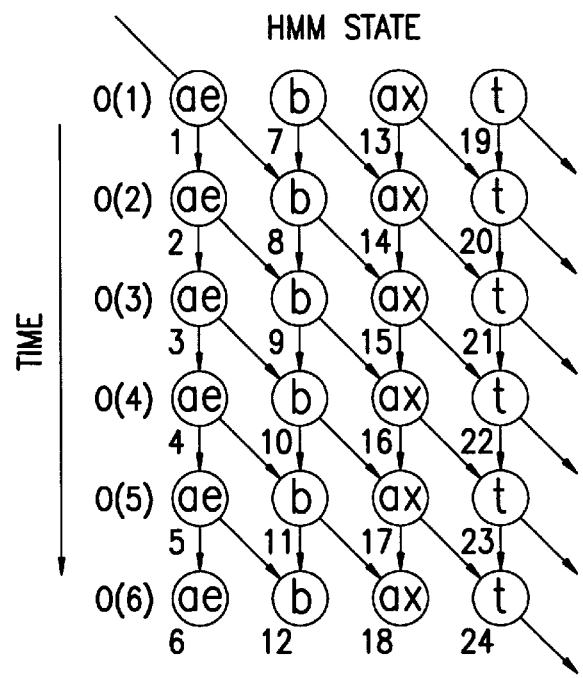
FIG. 8 is a schematic diagram of a hidden Markov model state sequence for the word ABBOT with respect to time demonstrating the state sequential calculation of the plurality of accumulated probabilities for each state.
Figure 9:
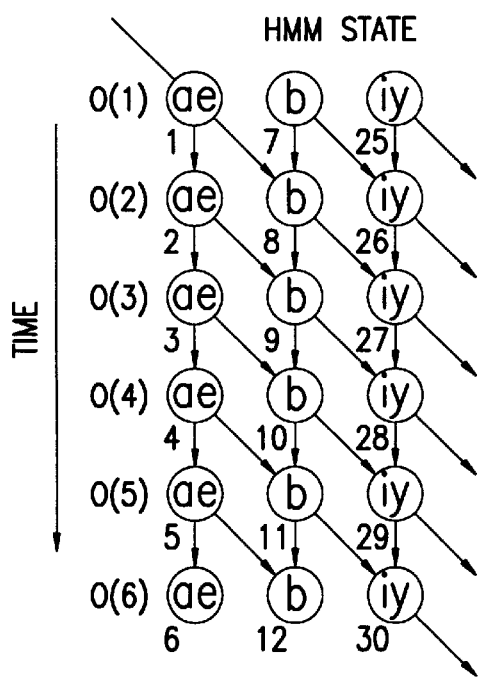
FIG. 9 illustrates schematically the hidden Markov model state the sequence for a subsequent word wherein the states corresponding to the phonemes "ae" and "b" are common.
Figure 10:
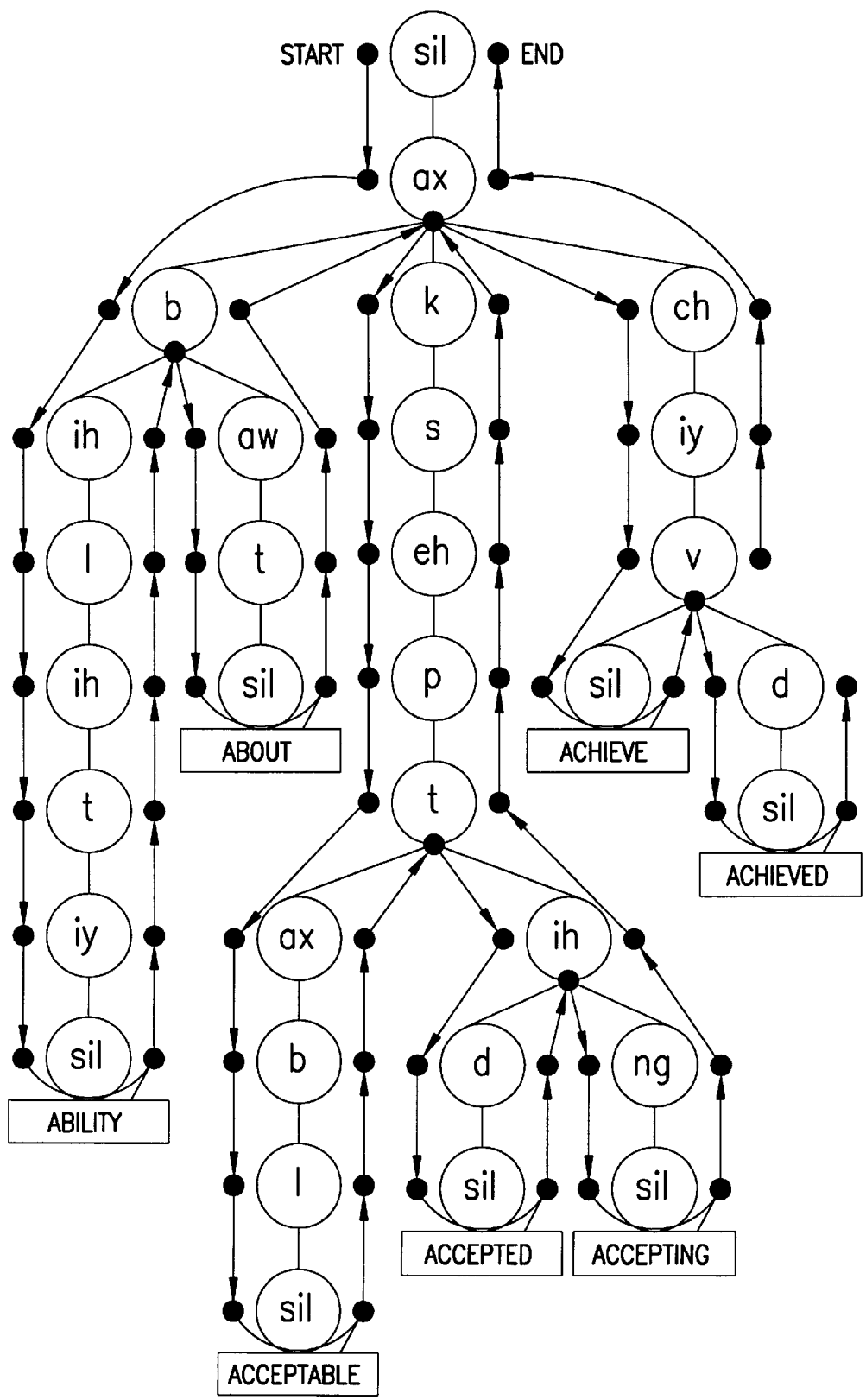
FIG. 10 illustrates the method used to calculate accumulated probabilities for a lexical tree structure.

For "left-to-right" hidden Markov models it may equally well be carried out as:

for j=1 to N
  for t=1 to T $$\phi_j(t) = \max_{i \leq j}(\phi_i(t-1)+\log a_{ij})+\log b_j(O(t)) \quad (7)$$

as illustrated in FIG. 8. Where the HMM models are arranged as a tree structure, where the next item or word to be searched shares a common prefix such as the word ABBEY shown in FIG. 9, computations numbers 1 to 12 can be retained from the previous word, 13 to 24 are discarded and 25 to 30 are added. In other words, from a leaf node in the tree, the process returns to a branch where it proceeds down the branch to the next leaf. This process is illustrated in FIG. 10 for discrete speech recognition where the word starts and ends with a pause representing silence i.e. the "phoneme" sil. The algorithm steps from node to node in the tree calculating all accumulated probabilities for a plurality of time frames for each node in the tree. In this embodiment a final state is always given as silence. However, for continuous speech recognition the final state could be the true final state of a word and at the final state there will be an indication of the identification of a word ending at the phoneme.

Figure 11:
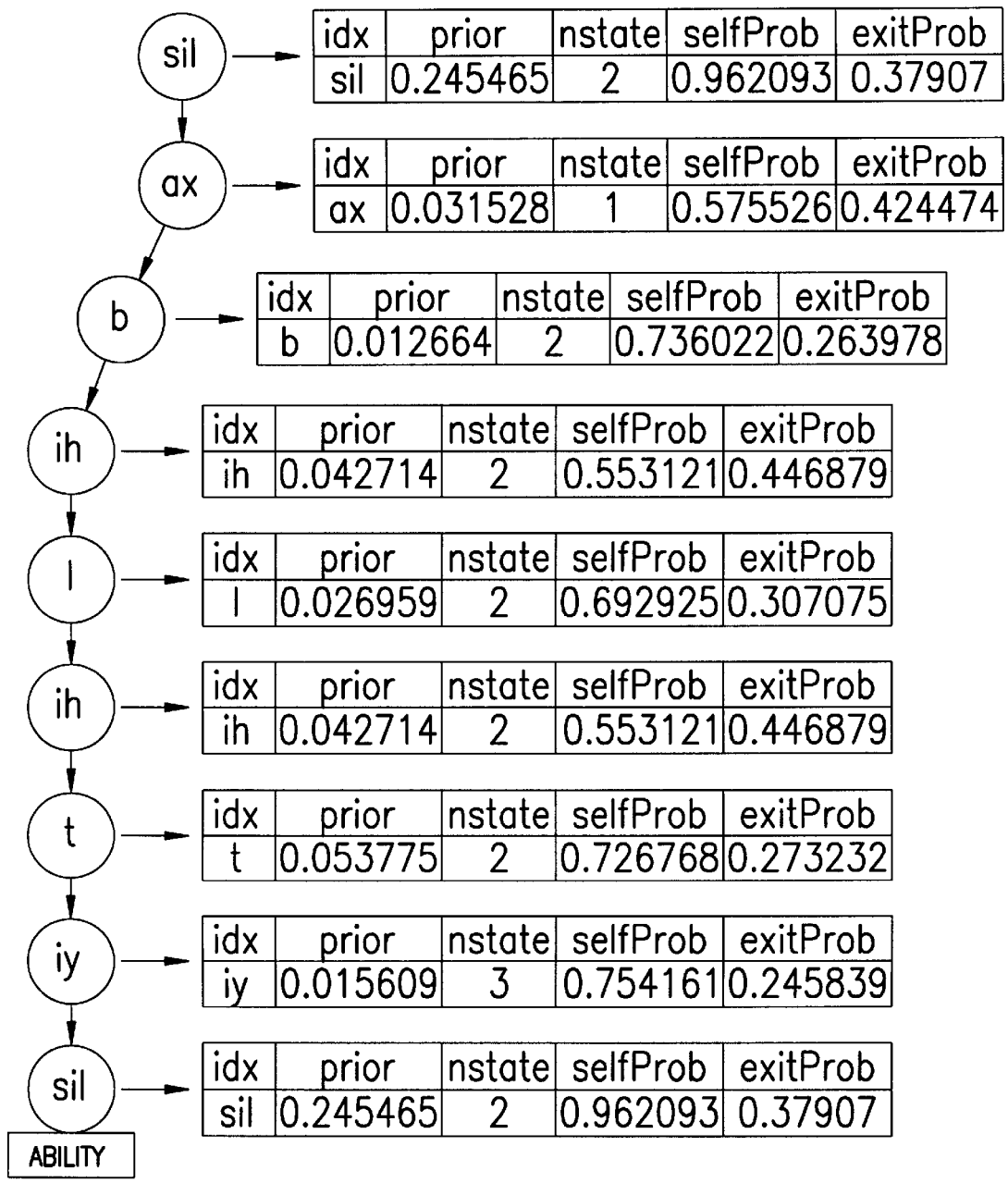
FIG. 11 illustrates how the probabilities for each phoneme corresponding to a state is obtained using a phone table.

Thus the tree structure data which is stored comprises data for each node of the tree which comprises a pointer for the next phoneme down the tree and information identifying any words ending at the phoneme. Also, data must be stored for the transition probabilities for each phoneme. FIG. 12 illustrates such data. Thus, to accumulate the probability there is a probability associated with the occurrence of the phoneme and a probability of a transition from one phoneme to the next as illustrated in FIG. 11. In order to reach the final state of the model of a word, all of the transition probabilities and the acoustic probabilities must be accumulated in memory. As can be seen from FIGS. 8 and 9, the memory requirements for accumulating the probabilities is a function of the number of states in the longest HMM model for a word and the maximum number of frames or observations required in order to reach the final state of the longest HMM model. Thus, not only are previous calculations reused but also the memory requirement is reduced.

As the HMM tree is traversed during the calculation of the accumulated probabilities, the identification of the word having the highest probability is stored or the identification of a number of words having the highest probabilities are stored in a table together with their probability values.

For discrete speech recognition since the words start and end with silence, the boundaries between words are discernible and thus it is possible to output only a single probability for the word. For continuous speech recognition, the boundaries between words is however less distinct and thus it is unclear when the final observation for the word occurs and a method of dealing with this will be described later.

Figure 13:
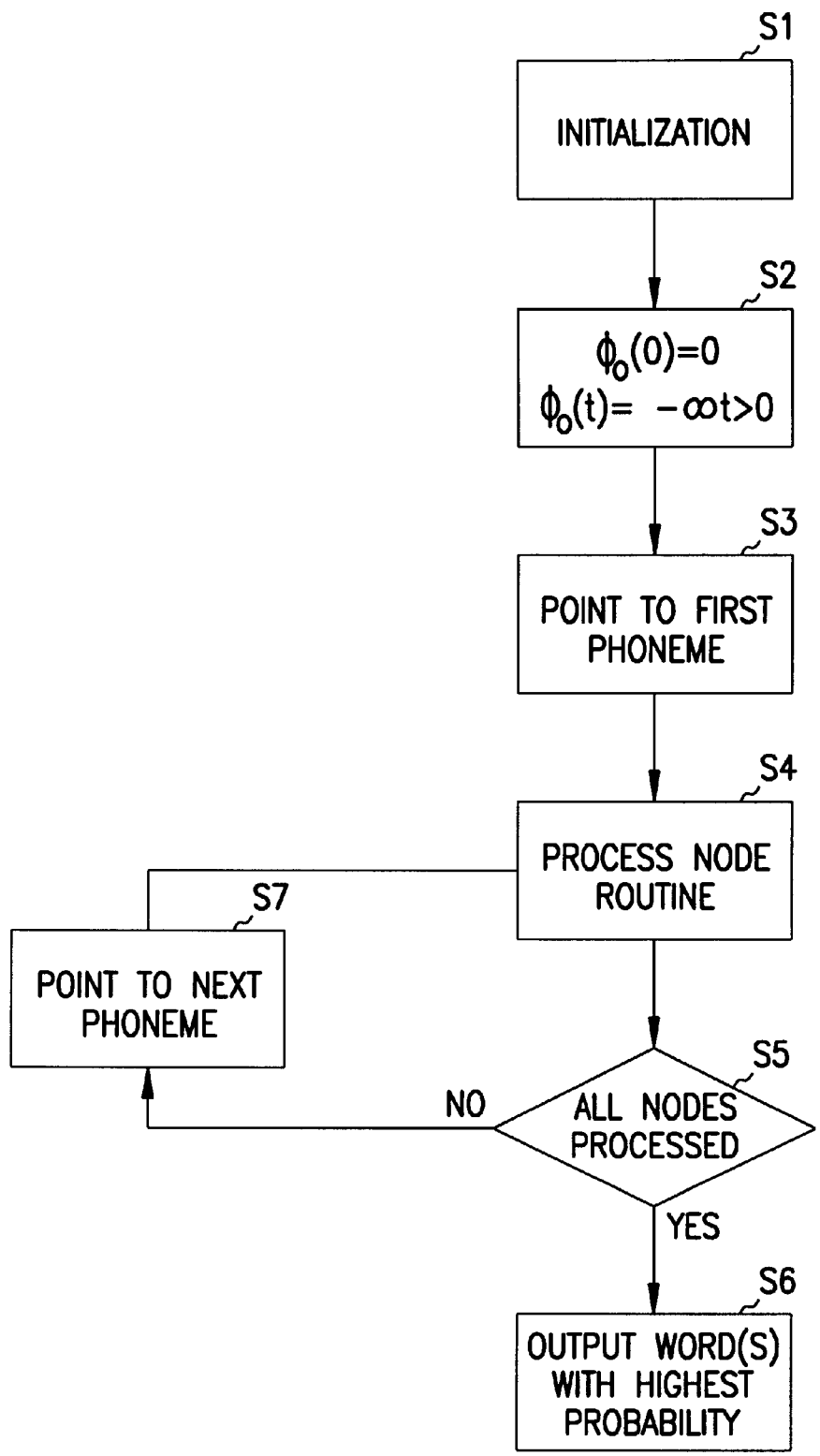
FIG. 13 is a flow diagram illustrating the steps used in calculating the accumulated probability in accordance with an embodiment of the present invention.
Figure 14:
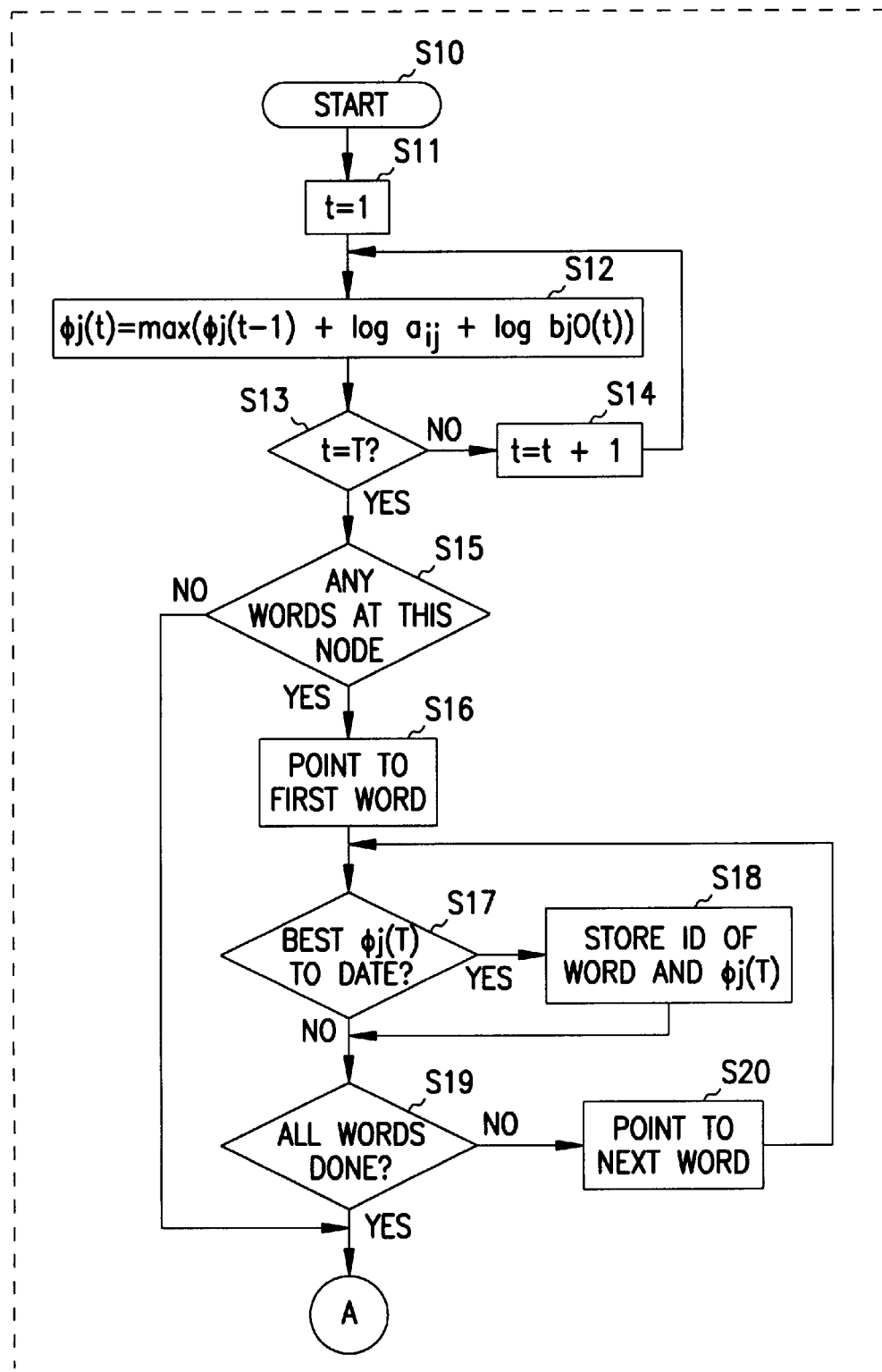
FIG. 14 is a flow diagram of the process node subroutine of FIG. 13.
Figure 14:
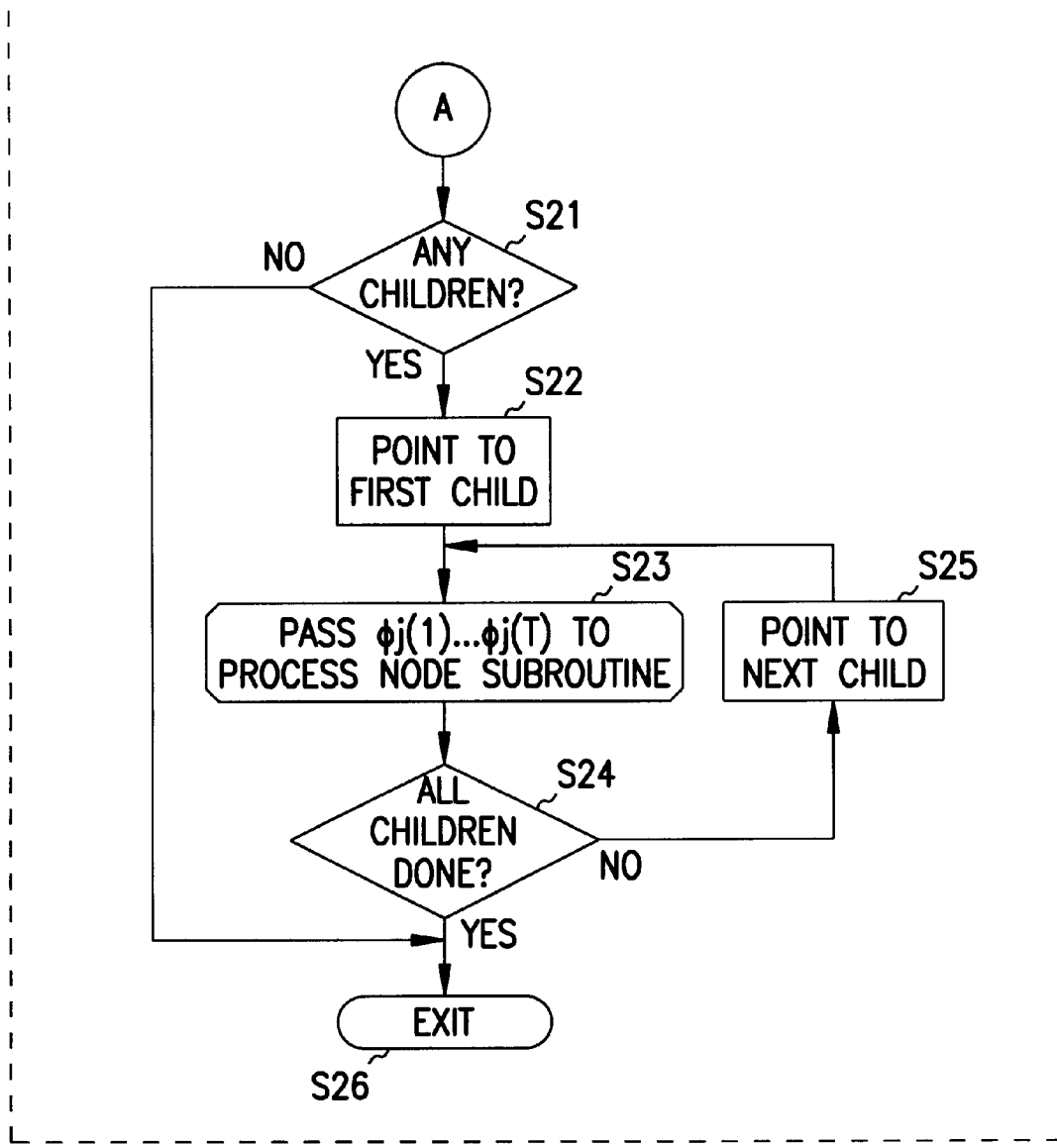

FIG. 13 is a flow diagram illustrating the steps carried out to accumulate the probabilities for the nodes in the tree in order to identify the word or words with the highest probability or probabilities. In step S1 the system is initialised. In step S2 the log probability at time 0 is set to zero and for all other times the probabilities are set to $-\infty$. In step S3 a first phoneme is selected to select one of the tree structures: there being up to one tree structure per phoneme i.e. 45. In step S4 the process node subroutine is called to calculate an accumulated probability for each node and in step S5 it is determined whether all of the nodes in all of the trees have been processed and if not in step S7 the next phoneme is pointed to in order to initiate the process node routine for the next tree structure. When all of the nodes of all of the trees have been processed in step S6 the word or words with the highest probability or probabilities is identified and output. FIG. 14 illustrates the process node subroutine of FIG. 13. In step S10 the process is started and in step S11 time t is set to equal 1. Then in step S12 the accumulated probability is calculated in accordance with the equation 6. In step S13 it is determined whether t=T which indicates the end of the input observations or if a silence detector is used, the end of a word, and if not t is incremented to read in the next observation. If t=T in step S15 it is determined whether there are any words indicated at this node. If not the process proceeds to step S21 whether it is determined whether there are any children i.e. branches. If in step S15 it is determined that there are words indicated at the node in step S16 the word is identified and in step S17 it is determined whether the accumulated probability $\phi_j(T)$ is the highest to date. If so the identification of the word and the accumulated probability is stored in step S18 and if not the process proceeds to step S19 to determine whether all of the words have been finished. If not the next word is pointed to in step S20 and the process returns to step S17. If all the words have been finished the process proceeds to step S21 to determine whether there are any children i.e. branches. If no the process is finished in step S26 otherwise in step S22 the first child is pointed to and in step S23 the process node subroutine is repeated for the child. In step S24 it is determined whether all of the children have been processed and if not in step 25 the next child is pointed to in order to carry out the process node subroutine in step S23. When all of the children have been processed the process node subroutine exits in step S26.

Thus the traversal of a pronunciation tree can be thought of as a recursive procedure. At every node the accumulated log probabilities are computed, if any words end at this point they are checked to see if they are the best scoring paths to date and all children of this node are processed in the same manner.

Figure 5:
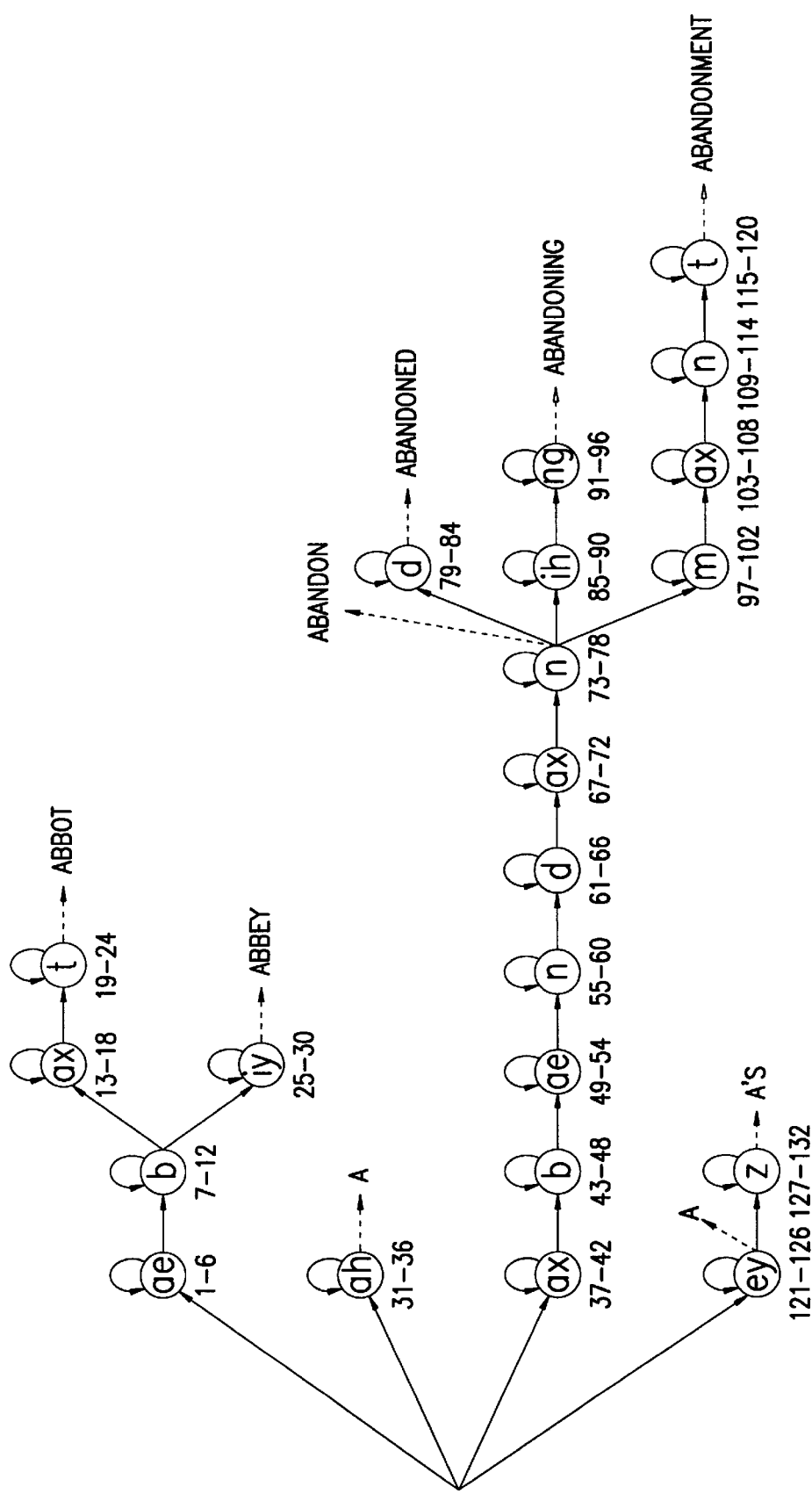
FIG. 5 is a schematic diagram of a tree structured hidden Markov model of part of a lexicon.
Figure 6:
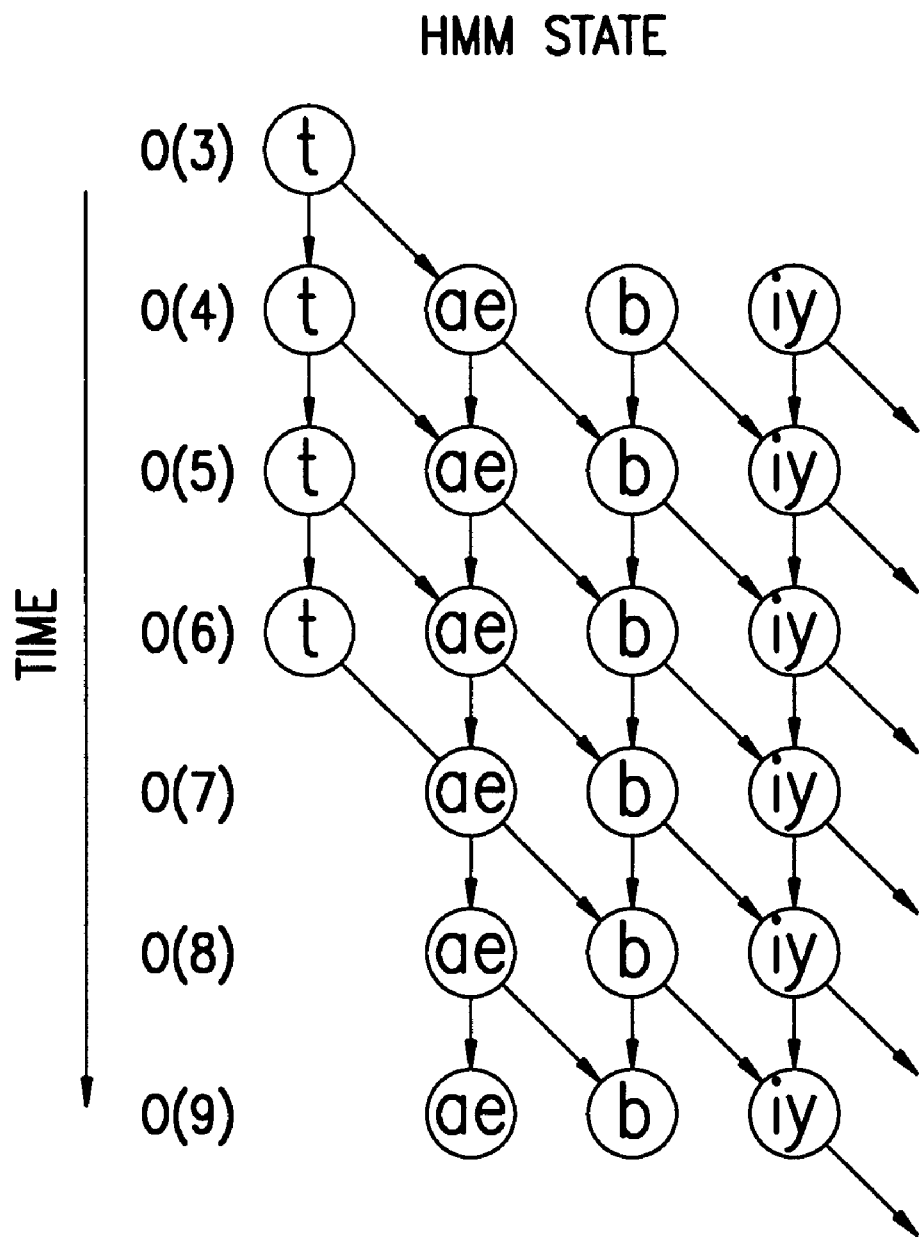
FIG. 6 is a schematic diagram of a hidden Markov model state sequence with respect to observations showing possible overlap in time between a word ending in "t" and the word ABBEY.

The tree structures have several advantages. They represent the lexicon more compactly than the simple linear structure whilst maintaining a unique path for each word. When searching a tree structure the shared prefixes result in fewer computations. Also, when pruning is employed, large areas of the search space can be disregarded with one decision as will be described hereinafter. However with the reordered search strategy in accordance with the present invention there is an additional advantage that the memory required to store the values of $\phi_j(t)$ scales as T by the longest word in the lexicon if the memory can be reused as a stack. In the case of Table 1 and FIG. 5 this requires a memory structure of T×11 locations to search the word abandonment with all other searches reusing the lower memory locations.

Consider an isolated word speech recognition system with a vocabulary of 65,000 words containing an average of 1.08 pronunciations per word (to take into consideration words having more than one pronunciation) and having 136,963 nodes in the pronunciation tree. If the maximum tree depth is 20 nodes and the average word length is 26 observations, assuming that there is no pruning and that the details of the best path are not required, the time synchronous algorithm uses 136,963 storage locations and the search algorithm in accordance with this embodiment of the present invention requires 520 storage locations i.e. 20×26. This represents a significant memory requirement reduction.

Figure 16:
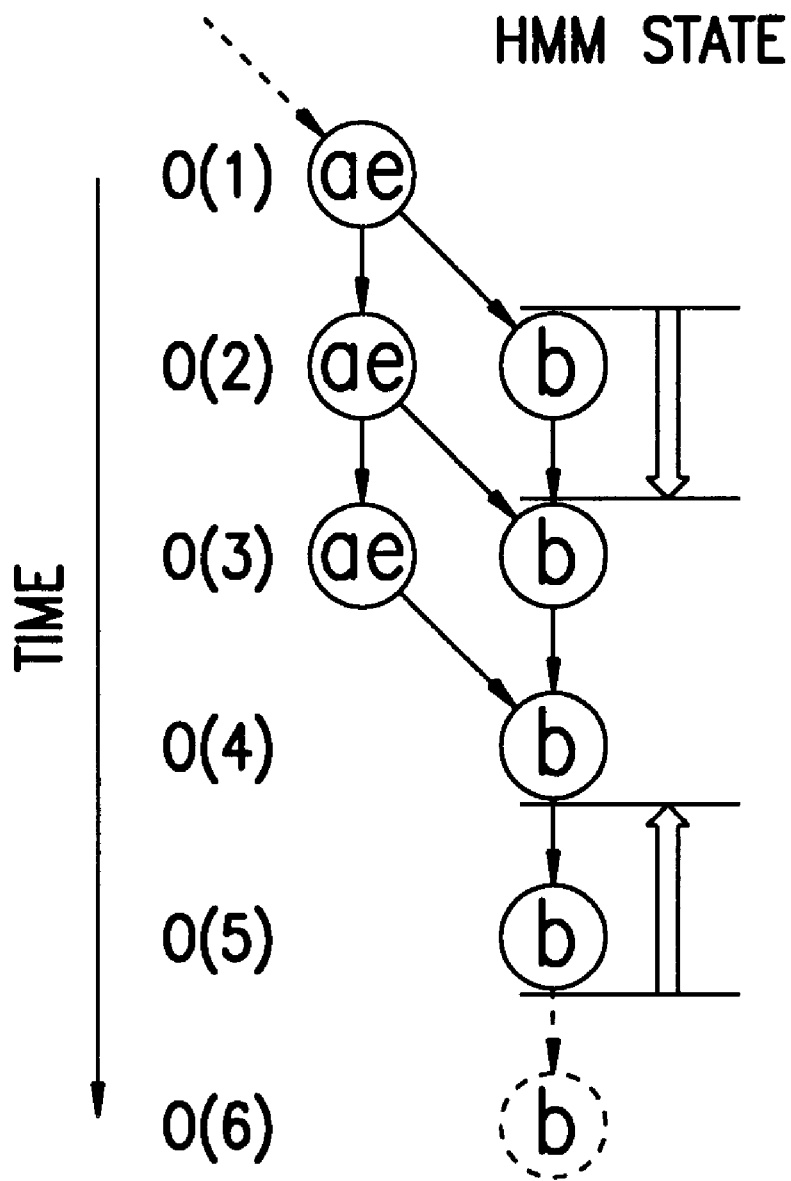
FIG. 16 illustrates the pruning process carried out in the hidden Markov model states.

The speed of the tree search algorithm may be greatly increased by using a pruning algorithm which although of significant benefit also brings the associated risk of occasionally making a suboptimal decision. In the time-first tree search technique pruning is defined as the time range over which a particular node in the tree is active. Typically both the start time and the end time of this range will increase by the average phoneme duration and indeed the start time must increase by at least the minimum duration of the phoneme (1 frame in these examples). The function of the pruning algorithm is to make this time range as small as possible such that it contains the best path. Subtrees of the pronunciation tree are pruned on the span of the time range decreases to zero. Pruning can be achieved with local or global heuristics. In the preferred embodiment the total likelihood for the phoneme model is used to terminate the extension of a node beyond the time range of its parent. This is followed by a comparison with a global threshold which is set by the best path to that point. These processes are illustrated in FIG. 16.

Figure 15:
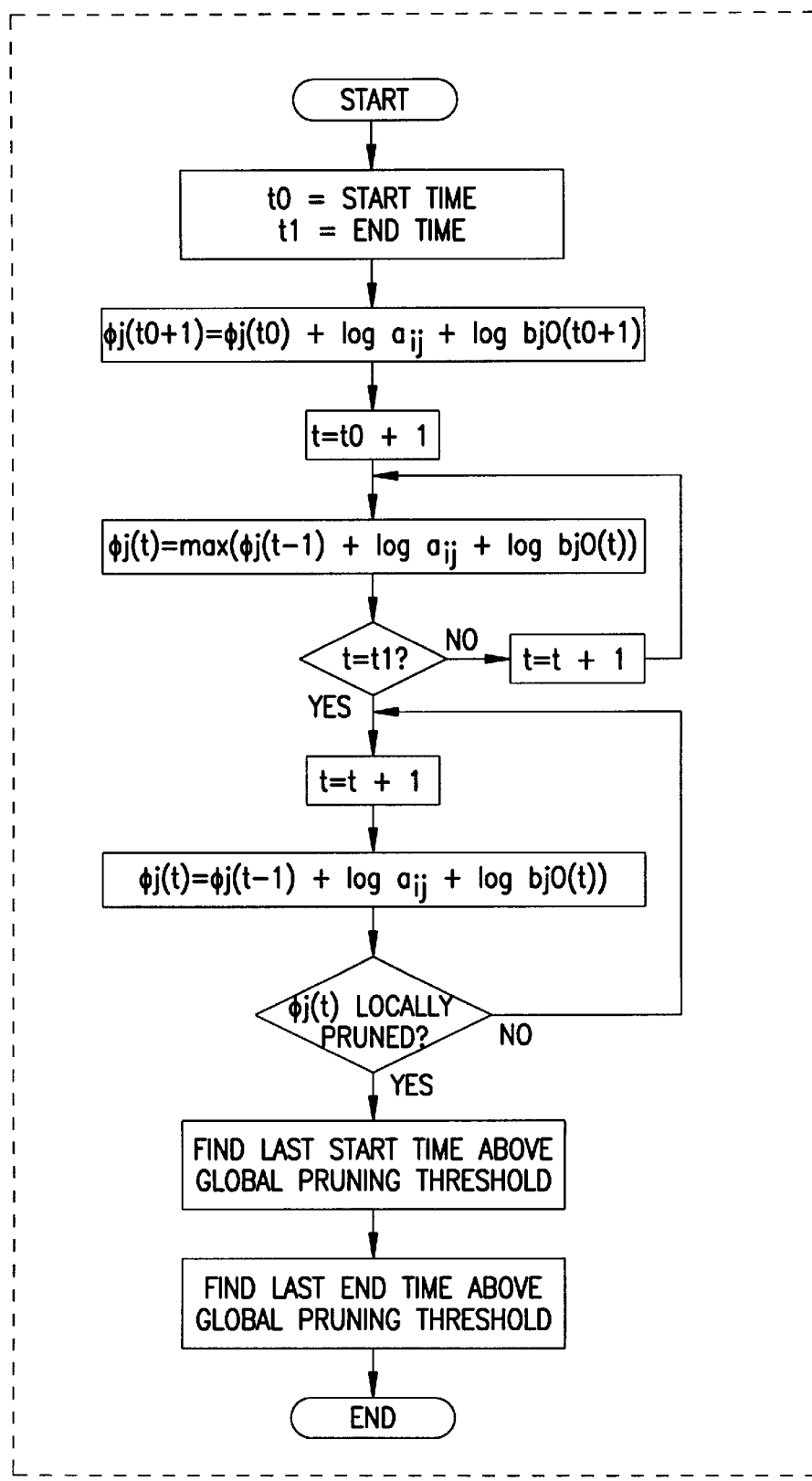
FIG. 15 is a flow diagram illustrating the pruning process.

Assuming the three states of ae are active then six states of b are computed, the last of which (shown as dashed lines) falls below the local pruning threshold. This defines a minimum and a maximum time for any future extensions which are then pruned using the global heuristic. Firstly the minimum time is extended until a node is found which exceeds the global pruning threshold, then the maximum time is decreased until it too falls below the pruning threshold. In this example both extremes are pruned by one node which results in the three b nodes (O(3) to O(6)). Finally, the new accumulated log probabilities, $\phi_i(t)$, for this layer are compared with a global array storing the best values seen for this time (independent of their position in the tree) and this array of best values is updated. The array of pruning thresholds may then be updated from the array of best log probabilities (or may be computed on the fly). FIG. 15 illustrates the steps which replace steps S10 to S14 in FIG. 14 when pruning is used.

An embodiment of the present invention implementing continuous speech recognition will now be described.

Continuous speech recognition in a stack decoder framework involves growing a tree of word hypotheses. In a simple implementation each leaf in the tree corresponds to one element on a stack. The stack may be ordered by time or by expected total path probability. Processing consists of popping the top item from the stack, extending it by each word in the lexicon and inserting the extended hypotheses into the stack. In addition, the finite state property of N-gram language models may be exploited by only maintaining the most probable stack items for each unique language model state. The list of word hypotheses to be processed may be kept on a global stack or on one stack per time slot.

Figure 17:
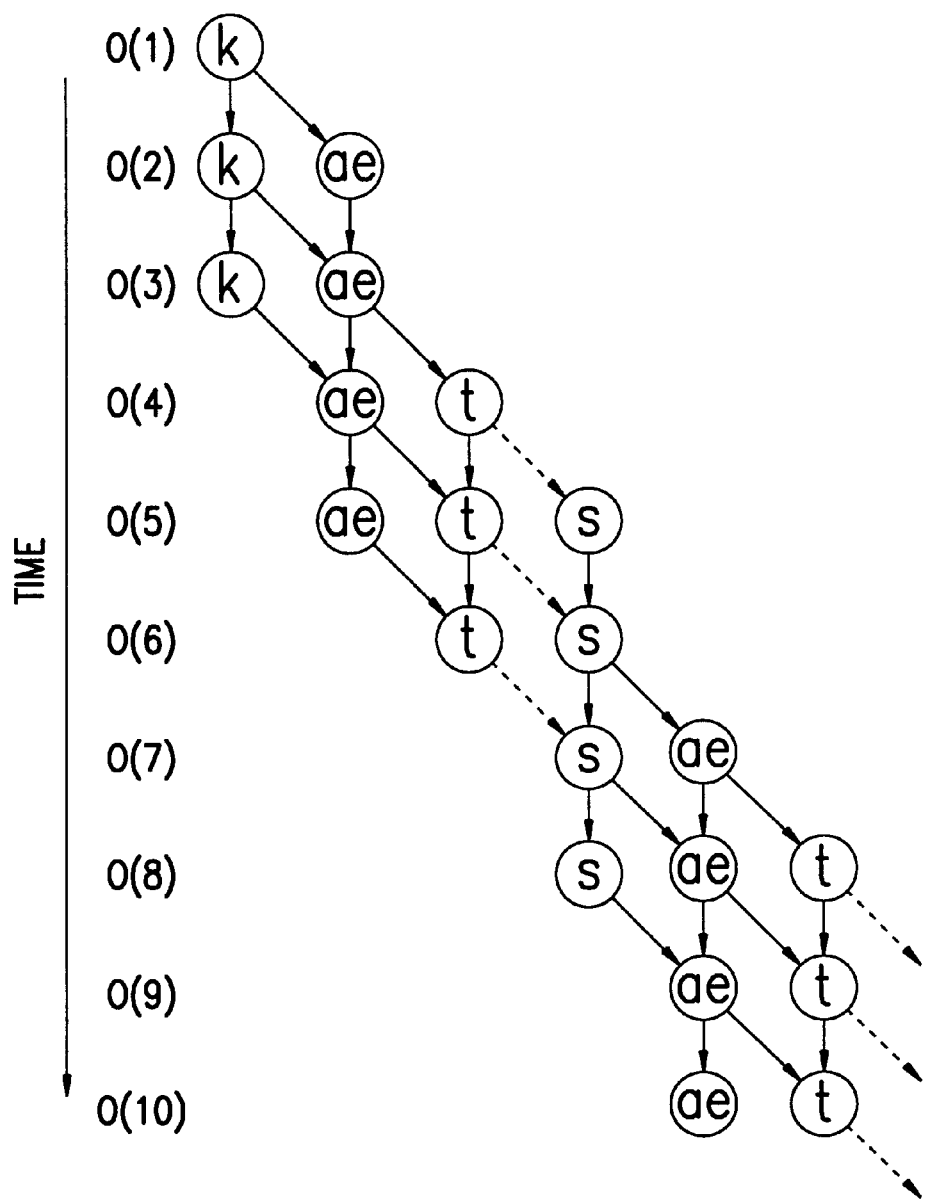
FIG. 17 illustrates the hidden Markov models for continuous speech for the words CAT and SAT showing the transitions in hidden Markov model states for observations 4–6.

When employing the state sequential search strategy it is advantageous to put together, as one stack item, a sequence of word hypotheses, where each hypothesis has associated with it the accumulated log probability and its location as a leaf in the tree of word hypotheses. Each stack item may be extended by all words in the lexicon by the method described hereinabove. For example, consider the joint recognition of the word CAT followed by the word SAT as illustrated in FIG. 17. Both parts of the diagram show the search space pruned as described hereinabove. Here it can be seen that there are three possible exit points from the word CAT which form entry points into the word SAT and that a data structure which groups together this information will result in a more efficient search compared with treating each path independently. Thus items held on the stack consist of:

1) the language model state (i.e. the last N-1 words)
2) the range of possible times for this language model state
3) for each time:
   (a) the accumulated log probability
   (b) the location in the word hypothesis tree.

These items are assembled into a stack ordered in time. In order to allow efficient insertion and removal of elements the stack uses the heap data structure (a priority queue) which provides partial ordering of the items whilst ensuring that the item on the top of the heap is next to be processed. Additionally a separate hash table of language model states is maintained so that any item in the heap may be rapidly indexed by its language model state. A history pointer indicates the leaf of the tree representing all active partial paths.

Figure 18:
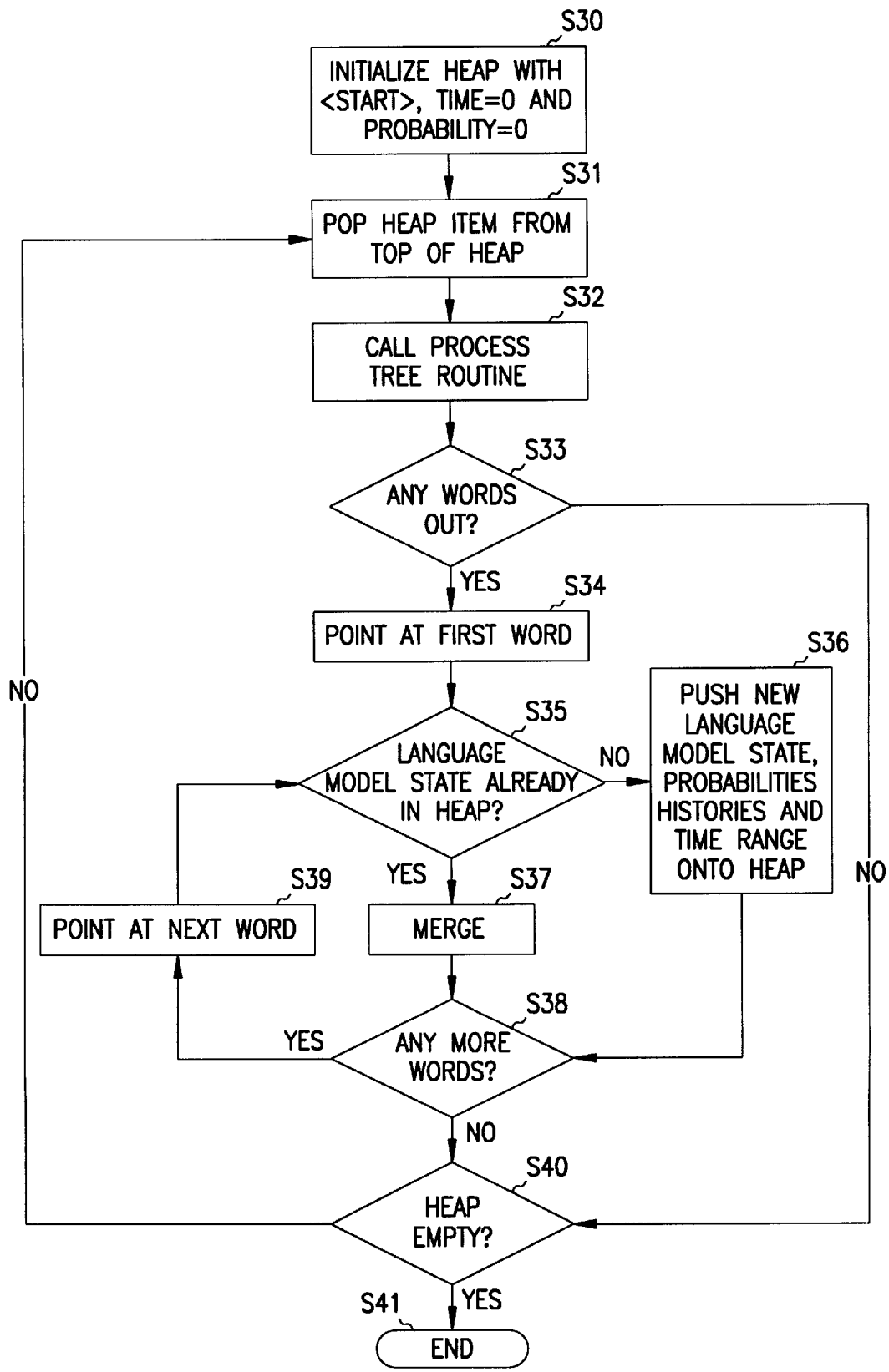
FIG. 18 is a flow diagram of the steps in recognising words using language model states stored in a heap.

The operation of the stack decoder will now be described with reference to FIGS. 18 to 21. As shown in FIG. 18 the heap is initialised in step S30 by inserting the Null partial path representing the start of the sentence. In step S31 the item on top of the heap is popped to be extended by one word to give one or more new word histories by calling the process tree routine in step S32 i.e. executing the steps of FIGS. 13 and 14. In step S33 it is determined whether there are any words output and if not the process proceeds to step S40 to determine whether the heap is empty. If words are output from the process tree routine the first word is pointed at in step S34 and in step S35 it is determined whether the language model resulting from the combination of the word with the previously popped language model is already in the heap. If not in step S36 the new language model state is pushed onto the heap together with the accumulated probabilities and histories and time range. If the language model state already exists in the heap in step S37 merge processing is carried out as will be described with reference to FIG. 20. In step S38 it is determined whether there are any more words to be processed and if so in step S39 the next word is pointed at and the process returns to step S35. If not in step S40 it is determined whether the heap is empty and if so the process returns to step S31, otherwise the process terminates in step S41.

Figure 20:
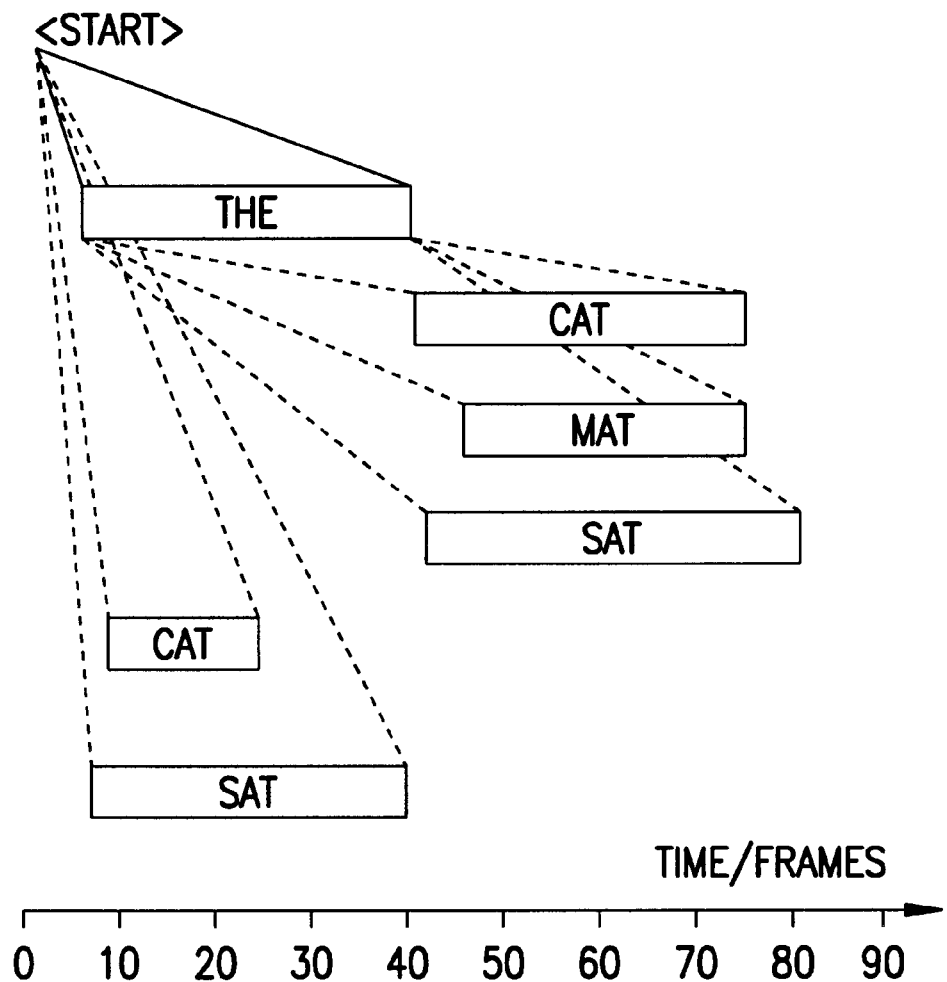
FIG. 20 is a diagram illustrating the word hypothesis tree with respect to time.
Figure 21:
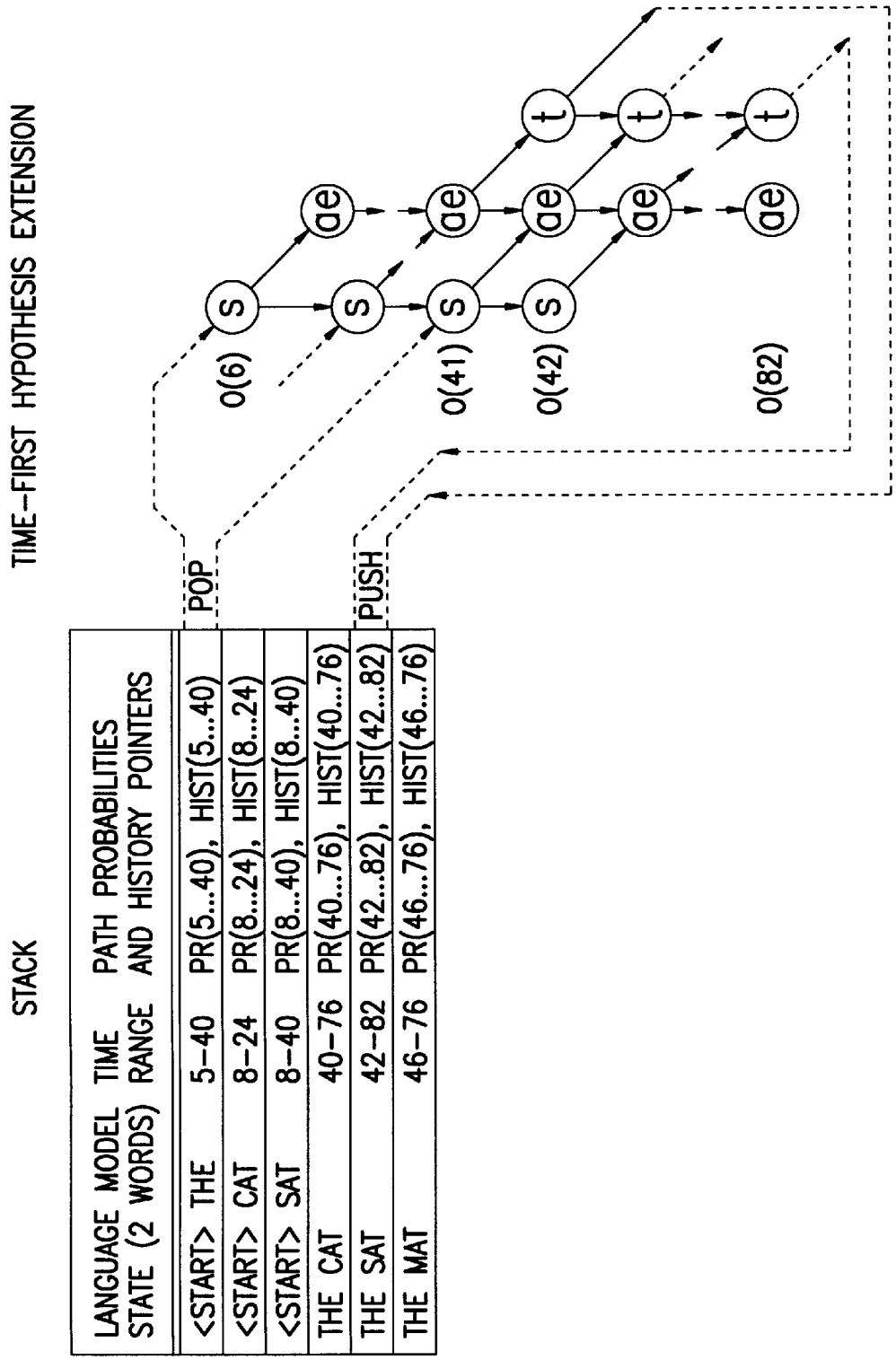
FIG. 21 is a diagram illustrating the process of extending a word hypothesis.

FIG. 20 illustrates the word hypothesis tree being grown in time from the start of the sentence and FIG. 21 illustrates the extension of one word hypothesis. In these figures the dashed lines represent cross word transitions. As can be seen in FIG. 21 the probabilities and history pointers 5 to 40 are popped out and form entry points into the word SAT at observations O(6) to O(41). The resulting accumulated probabilities in the final state t extend from observations O(42) to O(82). These accumulated probabilities can be modified by the language model probability for the combination of the words THE and SAT before being pushed into the stack. Thus, it can be seen that the group of accumulated probabilities provide for a plurality of entry points into current words from preceding words.

Figure 23:
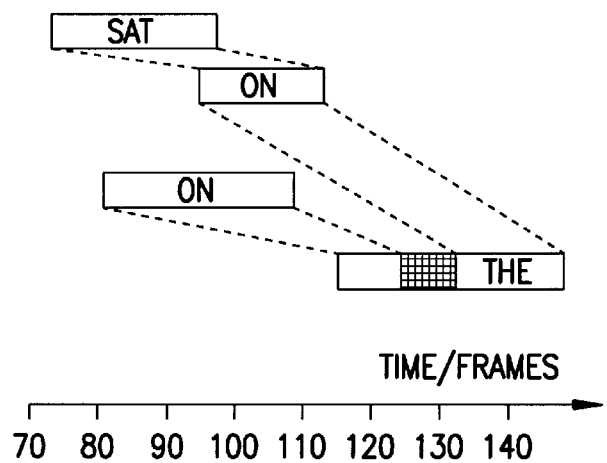
FIG. 23 illustrates the merging of word hypotheses that are disjointed.

It may be possible that a language model state is already present in the stack since as illustrated in FIG. 23 there are two possible word paths both ending in the language model state on THE. The hash table is consulted to decide whether these new paths should be merged with an item already existing on the heap or whether a new item should be added to the heap.

Figure 19:
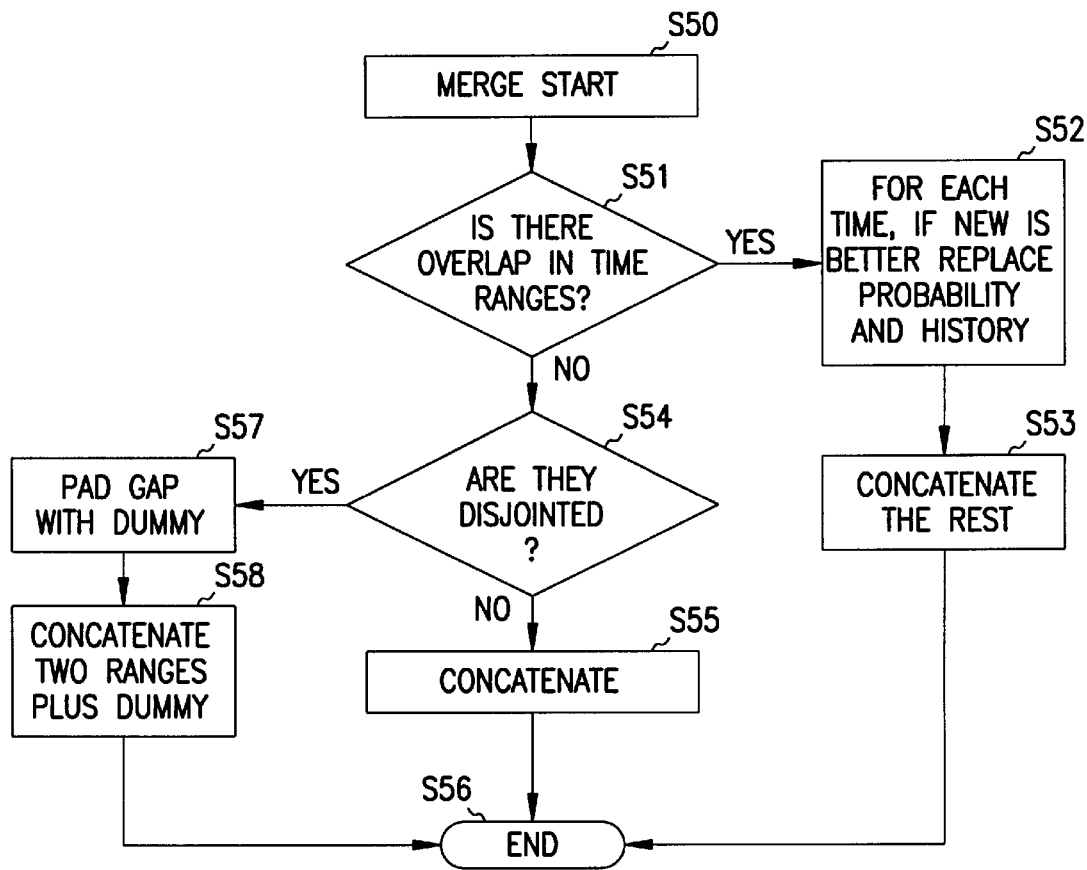
FIG. 19 is a flow diagram of the merge processing steps of FIG. 18.

FIG. 19 is a flow diagram illustrating the merge process. In step S50 the merge process starts and in step S51 it is determined whether there is an overlap in the time ranges of the stored accumulated probabilities and the calculated accumulated probabilities. If there is an overlap in time ranges then for each time if the newly calculated probability is better, the calculated probability is stored to replace stored probability and the history is also replaced. The remaining stored and calculated probabilities are concatenated in step S53. If there is determined to be no overlap in time ranges in step S51 in step S54 it is determined whether the ranges are disjointed. If they are not disjointed in step S55 the stored accumulated probabilities and the calculated accumulated probabilities are concatenated and the process terminates in step S56. If it is determined in step S54 that the stored accumulated probabilities and calculated accumulated probabilities are disjointed, in step S57 the gap is padded with dummy probabilities and in step S58 the stored accumulated probabilities and the calculated accumulated probabilities are concatenated with the dummy probabilities and the process terminates in step S56.

Figure 22:
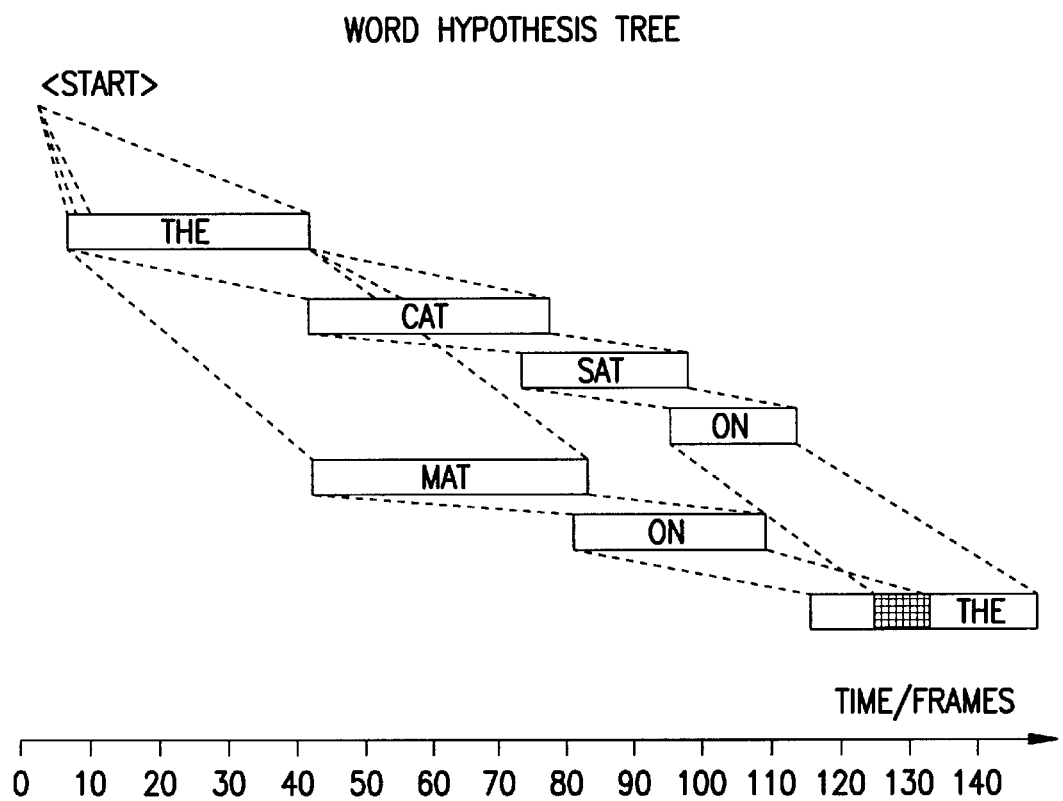
FIG. 22 illustrates the merging of word hypotheses that overlap.

FIG. 22 illustrates merge processing being carried out when there is an overlap in time ranges. As can be seen in FIG. 22 there are two word-level paths THE CAT SAT ON THE and THE MAT ON THE. At the end of the word THE any future extension has the same language modelling history (ON THE). The extension for the top path produced a range of valid extensions from time 125 to 148 and the lower path covered the time range 115 to 132. Thus overlap exists from time 125 to 132 and over this time range (shown as cross hatch) the two hypotheses are compared and the most probable word history is retained.

FIG. 23 illustrates merging word hypotheses that are disjointed. In this example the paths are merged but it is flagged that there is no valid hypothesis for the central time region.

Although in embodiments described hereinabove the language model used is a trigram, any finite state language model may be used in the same way.

In the continuous speech recognition system described with reference to FIGS. 17 to 23, a stack is used to store stack items consisting of a group of partial paths all of which have the same language model state. This results in more efficient implementation as fragmentation of language model unique paths occurs much less frequently than in the prior art. The organisation of a decoder that employs a single stack where each item corresponds to a time range, has a unique language model and is propagated time-first has many advantages:

the memory usage for the search is very small;

the search is fast thus real time performance may be achieved;

like most stack decoders continuous operation is relatively easy to implement;

search strategy is cooperative with a standard CPU memory cache and many operations fall into a small physical memory range;

the search strategy is cooperative with language model access patterns as the aim is that a particular N-gram is asked for only once;

more sophisticated acoustic models such as segmental models are naturally incorporated as the previous state accumulated log probabilities are readily to hand;

pruning and memory allocation share the same strategy and so work together.

Figure 24:
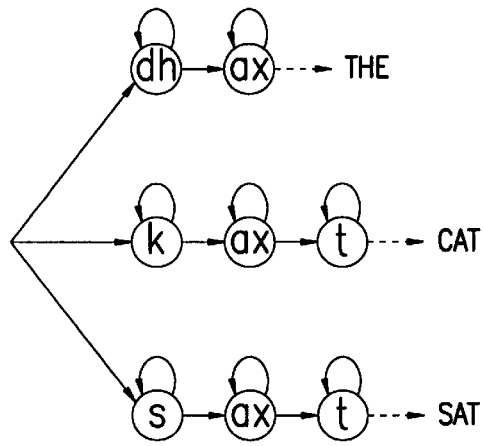
FIG. 24 illustrates a context independent pronunciation tree.
Figure 25:
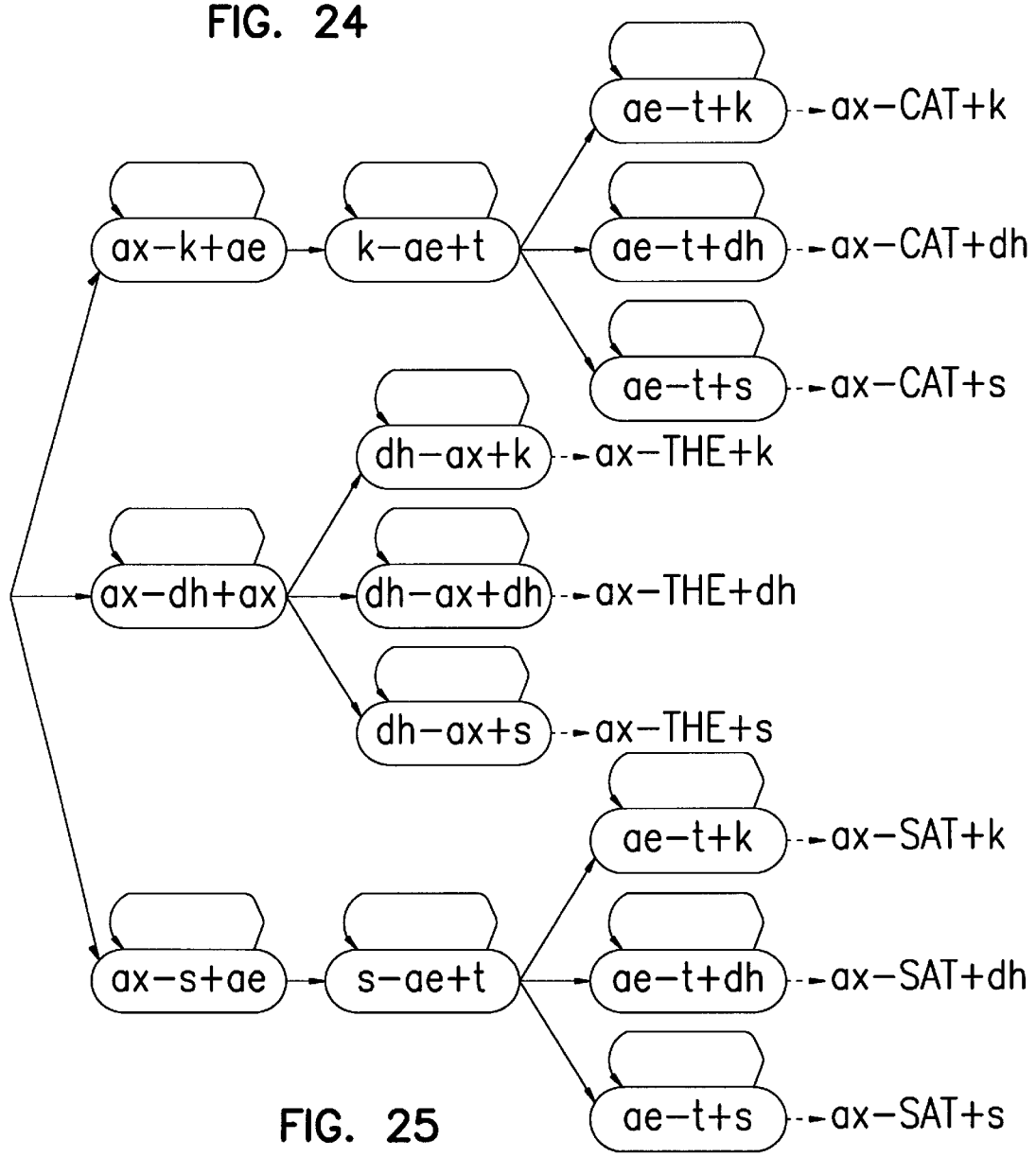
FIG. 25 illustrates a context dependent pronunciation tree.
Figure 26A:
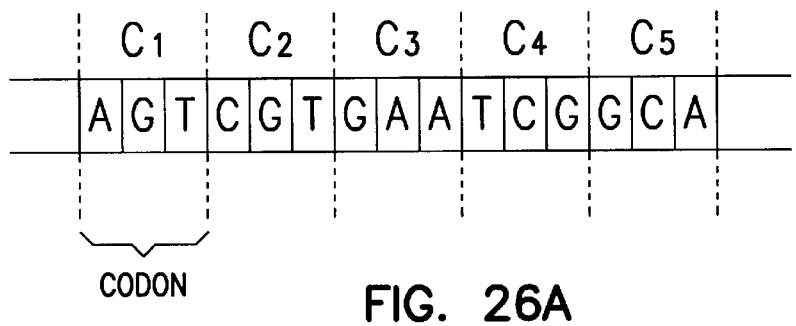
FIG. 26 is a diagram illustrating two different types of tokens forming two different types of items.
Figure 26B:
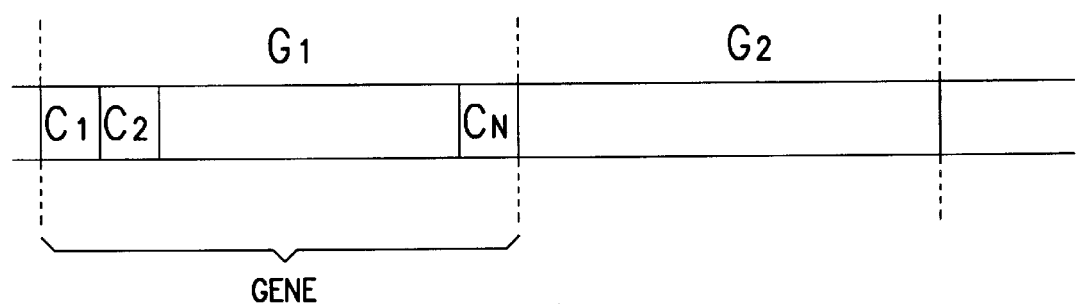
Figure 26C:
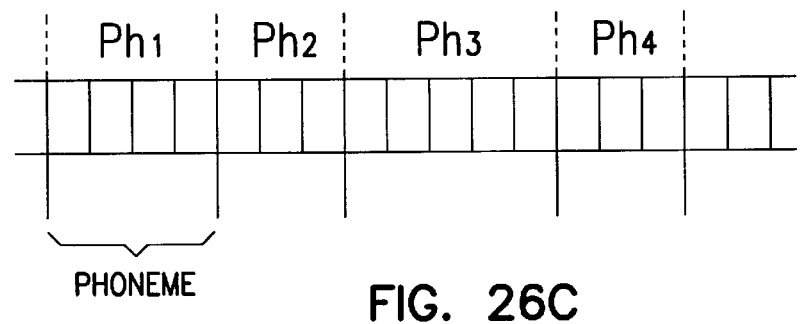
Figure 26D:
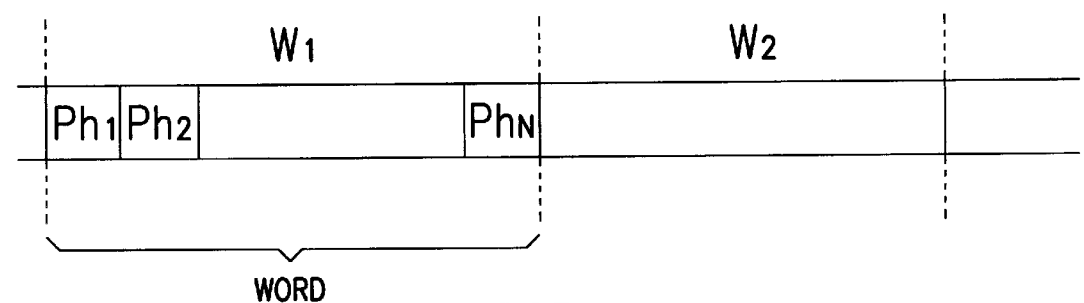

Although in the embodiments described hereinabove context independent phoneme models have been used, which provide a tree lexicon as for example shown in FIG. 24, the present invention is not limited to such phoneme models and context dependent phoneme models can also be used. The use of such phoneme models results in a broader pronunciation tree where the expansion occurs because each node must exist in the appropriate context for the following phonemes. The phonemes at the root, and the leaves of the tree require special consideration. The leaf phonemes should be expanded to take into account all possible following context and this whole tree duplicated for the number of future contexts. This process is illustrated in FIG. 25 for three word lexicon THE CAT and SAT. The terminology X–Y+Z means phoneme Y with left context of X and right context of Z. The next tree is similar to FIG. 17 with the initial left context of ax replaced by t. The choice of leaf node at the end of one word determines the first branch taken in the next tree.

Although the present invention has been described hereinabove with reference to speech recognition, the present invention is not limited to speech recognition and can be utilised for the recognition of any sequential data which can be represented as tokens forming one or more groups of items. For example, FIG. 26 illustrates a comparison between the data structure of speech and a genetic sequence in DNA. In speech a phoneme Ph is comprised of a number of speech segments e.g. sample frames. A word is then comprised of a number of phonemes. DNA comprises nucleic acids adenine, guanine, cytosine and thymine (A,G,C and T). A codon comprises a number of nucleic acids in sequence and a gene comprises a number of codons in sequence. Thus, the method of the present invention can be applied to the field of genetic sequencing in order to detect a sequence of genes.

Since the present invention can be implemented on a standard computer, the present invention can be embodied as computer executable code stored on a storage medium such as a magnetic medium (disc or tape) optical disc or programmable memory.

Although the present invention has been described hereinabove by reference to specific embodiments, the present invention is not limited to such embodiments and it will be apparent to a skilled person in the art that modifications are possible within the spirit and scope of the present invention.

What is claimed is:

1. A method of automatically recognising data comprising sequential data units represented as sequential tokens grouped into one or more items, the method comprising the steps of:

storing data representing known items as respective finite state sequence models, where each state corresponds to a token and said models having common prefix states are organised in a tree structure such that suffix states comprise branches from common prefix states and there are a plurality of tree structures each having a different prefix state;

comparing each sequential data unit with stored reference data units identified by respective reference tokens to generate scores for each data unit indicating the similarity of the data unit to respective said reference data units;

determining an accumulated score for a final state in each of a number of the models by
a) sequentially calculating the accumulated score for a model to reach the final state comprising a leaf in the tree,
b) identifying the closest branch to the leaf corresponding to a next model for which an accumulated score for the final state has not yet been calculated,
c) accumulating the score from the identified closest branch for the next model to the final state,
d) repeating steps (b) and (c) for the branches of the tree, and
e) repeating steps (a) to (d) for the plurality of trees; and identifying at least the item corresponding to the model having the highest accumulated score.

2. A method according to claim 1 wherein said comparing step generates probabilities for each data unit;

said storing step comprises storing the data representing each known item as a hidden Markov model having state transition probabilities giving the probability of a transition from a state to another state; and the determining step comprises determining an accumulated probability using the probabilities for each data unit and the state transition probabilities.

3. A method according to claim 2 wherein a state transition probability for each token is stored.

4. A method according to claim 2 wherein said comparing step comprises storing data representing reference data units as hidden Markov models, where each state corresponds to a subdata unit, and determining accumulated probabilities for each data unit identified by a respective token.

5. A method according to claim 2 wherein said hidden Markov model is a left to right hidden Markov model.

6. A method according to claim 1 wherein the data which is stored representing known items comprises for each state:
   a) a transition probability,
   b) data identifying the next state in the state sequence of a model, and
   c) data identifying any items for which the state is the last state in the state sequence.

7. A method according to claim 1 wherein the determining step includes the step of pruning the calculations by halting the accumulation of the scores for any branches where the accumulated score falls below a threshold.

8. A method according to claim 1 wherein there are a finite set of tokens and each token appears in more than one item.

9. A method according to claim 1 wherein each token is independent of preceding and succeeding tokens.

10. A method according to claim 1 wherein each token depends on neighbouring tokens in the finite state sequence.

11. A method according to claim 1 wherein said finite state sequence model includes self transitions within a state and transitions from one state to another such that each state comprises a plurality of temporal states corresponding in time to the sequence of tokens, and the accumulated score for the final state in the models is calculated by calculating the accumulated score for the temporal states for a state in a timewise manner before calculating the temporal states for the next state in a timewise manner.

12. A method according to claim 11 including the repeated steps of storing the accumulated scores for the temporal states for a final state of a model of an item as a group in memory means, together with information identifying a grouping model state used to arrive at the final state, information identifying positions in the tree structure and information identifying the temporal position of the accumulated scores;
   reading a previously stored group of accumulated scores from said memory means;
   using said accumulated scores for the plurality of temporal states as a plurality of temporally different initial scores for the calculation of the accumulated scores for the plurality of temporal states of a final state of a model of a subsequent item; and
   determining the grouping model state used to arrive at the final state of the model of the subsequent item from the identification of the subsequent item and the grouping model state of the read group of accumulated scores.

13. A method according to claim 12 including the step of storing a score for each of said grouping model states to indicate the likelihood of items being sequentially grouped based on a grouping model of likely item sequences, and modifying the accumulated scores for the plurality of temporal states of a final state of a model of an item by the score for the grouping model state before being stored in said memory means.

14. A method according to claim 12 wherein said groups of accumulated scores and associated information are ordered temporally.

15. A method according to claim 12 wherein said groups of accumulated scores and associated information are ordered by their scores.

16. A method according to claim 12 wherein if a said determined grouping model state is already stored in said memory means, the calculated accumulated scores and associated information are merged with the stored group of accumulated scores and associated information in temporal alignment whereby if there is temporal overlap between accumulated scores, the highest accumulated score is stored in said memory means together with the respective associated information.

17. A method according to claim 1 wherein said data comprises digitised speech, said sequential data units comprise sample frames of the speech data, said tokens comprise units of speech, and said items comprise spoken words.

18. Recognition apparatus for recognising sequential tokens grouped into one or more items, the apparatus comprising:
   storage means for storing data representing known items as respective finite state sequence models, where each state corresponds to a token and said models having common prefix states are organised in a tree structure such that suffix states comprise branches from common prefix states and there are a plurality of tree structures each having a different prefix state;
   comparing means for comparing each sequential data unit with stored reference data units identified by respective reference tokens to generate scores for each data unit indicating the similarity of the data unit to respective said reference data units;
   determining means for determining an accumulated score for a final state in each of a number of the models comprising
      a) means for sequentially calculating the accumulated score for a model to reach the final state comprising a leaf in the tree,
      b) means for identifying the closest branch to the leaf corresponding to a next model for which an accumulated score for the final state has not yet been calculated, and
      c) means for accumulating the score from the identified closest branch for the next model to the final state, wherein the scores are accumulated for the branches of the tree and accumulated for the plurality of trees; and
   means for identifying at least the item corresponding to the model having the highest accumulated score.

19. Recognition apparatus according to claim 18 wherein said comparing means is adapted to generate probabilities for each data unit;
   said storage means is adapted to store the data representing known items as a hidden Markov model having state transition probabilities giving the probability of a transition from a state to another state; and
   said determining means is adapted to determine an accumulated probability using the probabilities for each data unit and the state transition probabilities.

20. Recognition apparatus according to claim 19 wherein said storage means is adapted to store a state transition probability for each token.

21. Recognition apparatus according to claim 19 wherein said comparing means is adapted to store data representing reference data units as hidden Markov models in said storage means, where each state corresponds to a subdata unit, and to determine accumulated probabilities for each data unit identified by a respective token.

22. Recognition apparatus according to claim 18 wherein said storage means is adapted to store the data representing known items as, for each state, (a) a transition probability, (b) data identifying the next state in the sequence of a model, and (c) data identifying any items for which the next state is the last state in the state sequence.

23. Recognition apparatus according to claim 18 wherein said determining means includes pruning means for pruning the calculation by halting the accumulation of the scores for any branches where the accumulated score falls below a threshold.

24. Recognition apparatus according to claim 18 wherein said finite state sequence model includes self transitions within a state and transitions from one state to another such that each state comprises a plurality of temporal states corresponding in time to the sequence of tokens, and said means for calculating the accumulated score is adapted to calculate the accumulated scores for the temporal states for a state in a timewise manner before calculating the temporal states for the next state in a timewise manner.

25. Recognition apparatus according to claim 24 including second storage means, for storing the accumulated scores for the temporal states for a final state of a model of an item as a group together with information identifying a grouping model state used to arrive at the final state, information identifying positions in the tree structure and information identifying the temporal position of the accumulated scores;
    reading means for reading a group of accumulated scores from said second storage means;
    wherein said calculating means is adapted to use the said accumulated scores for the plurality of temporal states as a plurality of temporally different initial scores for the calculation of the accumulated scores for the plurality of temporal states of a final state of a model of a subsequent item; and
    including means for determining the grouping model state used to arrive at the final state of the model of the subsequent item from the identification of the subsequent item and the grouping model state of the read group of accumulated scores.

26. Recognition apparatus according to claim 25 including means for storing a score for each of said grouping model states to indicate the likelihood of items being sequentially grouped based on a grouping model of likely item sequences, and means for modifying the accumulated scores for the plurality of temporal states of a final state of a model of an item by the score for the grouping model state before being stored in said second storage means.

27. Recognition apparatus according to claim 25 wherein said second storage means is adapted to store said groups of accumulated scores and associated information ordered temporally.

28. Recognition apparatus according to claim 25 wherein said second storage means is adapted to store said groups of accumulated scores and associated information ordered by their scores.

29. Recognition apparatus according to claim 25 including merging means for, if a said determined grouping model state is already stored in said second storage means, merging the calculated group of accumulated scores and associated information with the stored group of calculated scores and associated information in temporal alignment whereby if there is temporal overlap between accumulated scores, the highest accumulated score is stored in said second storage means together with the respective associated information.

30. Speech recognition apparatus comprising the recognition apparatus of claim 18 wherein said data comprises digitised speech, said sequential data units comprise sample frames of the speech data, said tokens comprise units of speech, and said items comprise spoken words.

31. A method of automatically recognising data comprising sequential data units represented as sequential tokens grouped into a plurality of items, the method comprising the steps of:
    storing data representing known items as respective finite state sequence models where each state corresponds to a token and each state comprises a plurality of temporal states corresponding in time to the sequence of tokens;
    comparing each sequential data unit with stored reference data units identified by respective reference tokens to generate scores for each data unit indicating the similarity of the data unit to respective said reference data units;
    determining accumulated scores for a plurality of temporal states for a final state in the models by accumulating scores for a plurality of temporal states for each state in the model;
    storing the accumulated scores for the final state of a model as a group together with information identifying the temporal position of the accumulated scores and information identifying a grouping model state used to arrive at the final state;
    reading a previously stored group of accumulated scores;
    using said accumulated scores for the plurality of temporal states as a plurality of temporally different initial scores for the calculation of the accumulated scores for the plurality of temporal states of a final state of a model of a subsequent item; and
    determining the group model state used to arrive at the final state of the model of the subsequent item from the known identity of the subsequent item corresponding to the model and the group model state of the read group of accumulated scores.

32. A method according to claim 31 wherein said comparison step generates probabilities for each data unit;
    said storing step comprises storing the data representing known items as hidden Markov models having state transition probabilities and self transition probabilities, and the determining step comprises determining accumulated probabilities using the state transition probabilities, the self transition probabilities and the probabilities for each data unit.

33. A method according to claim 32 wherein said hidden Markov models comprise left to right hidden Markov models.

34. A method according to claim 31 including the step of storing a score for each of said grouping model states to indicate the likelihood of items being sequentially grouped based on a grouping model of likely item sequences, and modifying the accumulated scores for the plurality of temporal states of a final state of a model of an item by the score for the grouping model state before being stored in said memory means.

35. A method according to claim 31 wherein said groups of accumulated scores and associated information are ordered temporarily.

36. A method according to claim 31 wherein said groups of accumulated scores and associated information are ordered by their scores.

37. A method according to claim 31 wherein if a said determined grouping model state is already stored in said memory means, the calculated accumulated scores and associated information are merged with the stored group of accumulated scores and associated information in temporal alignment whereby if there is temporal overlap between accumulated scores, the highest accumulated score is stored in said memory means together with the respective associated information.

38. A method according to claim 31 wherein said data comprises digitised speech, said sequential data units comprise sample frames of the speech data, and tokens comprise units of speech, and said items comprise spoken words.

39. Recognition apparatus for recognising sequential tokens grouped into a plurality of items, the apparatus comprising:

first storage means for storing data representing known items as respective finite state sequence models, where each state corresponds to a token, and each state comprises a plurality of temporal states corresponding in time to the sequence of tokens;

comparing means for comparing each sequential data unit with stored reference data units identified by respective reference tokens to generate scores for each data unit indicating the similarity of the data unit to respective said reference data units;

determining means for determining accumulated scores for a plurality of temporal states for a final state in the models by accumulating scores for a plurality of temporal states for each state in the model;

second storage means for storing the accumulated scores for the final state of a model as a group together with information identifying the temporal position of the accumulated scores and information identifying a group model state used to arrive at the final state;

reading means for reading a previously stored group of accumulated scores;

wherein said determining means is adapted to use said accumulated scores for the plurality of temporal states as a plurality of temporally different initial scores for the calculation of the accumulated scores for the plurality of temporal states of a final state of a model of a subsequent item; and the apparatus includes group model state determining means for determining the group model state used to arrive at the final state of the model of the subsequent item from the known identity of the subsequent item corresponding to the model and the group model state of the read group of accumulated scores.

40. Recognition apparatus according to claim 39 wherein said comparison means is adapted to generate probabilities for each data unit;

said first storage means is adapted to store the data representing known items as hidden Markov models having state transition probabilities and self transition probabilities; and said determining means is adapted to determine accumulated probabilities using the state transition probabilities, the self transition probabilities and the probabilities for each data unit.

41. Recognition apparatus according to claim 40 wherein said hidden Markov models comprise left to right hidden markov models.

42. Recognition apparatus according to claim 39 including means for storing a score for each of said grouping model states to indicate the likelihood of items being sequentially grouped based on a grouping model of likely item sequences, and means for modifying the accumulated scores for the plurality of temporal states of a final state of a model of an item by the score for the grouping model state before being stored in said second storage means.

43. Recognition apparatus according to claim 39 wherein said second storage means is adapted to store said groups of accumulated scores and associated information ordered temporally.

44. Recognition apparatus according to claim 39 wherein said second storage means is adapted to store said groups of accumulated scores and associated information ordered by their scores.

45. Recognition apparatus according to claim 39 including merging means for, if a said determined grouping model state is already stored in said second storage means, merging the calculated group of accumulated scores and associated information with the stored group of calculated scores and associated information in temporal alignment whereby if there is temporal overlap between accumulated scores, the highest accumulated score is stored in said second storage means together with the respective associated information.

46. Speech recognition apparatus comprising the recognition apparatus of claim 39 wherein said data comprises digitised speech, said sequential data units comprise sample frames of the speech data, said tokens comprise units of speech, and said items comprise spoken words.

47. A storage device storing computer readable instructions for causing a programmable processing apparatus to perform a method of automatically recognising data comprising sequential data units represented as sequential tokens grouped into one or more items, the method comprising the steps of:

storing data representing known items as respective finite state sequence models, where each state corresponds to a token and said models having common prefix states are organised in a tree structure such that suffix states comprise branches from common prefix states and there are a plurality of tree structures each having a different prefix state;

comparing each sequential data unit with stored reference data units identified by respective reference tokens to generate scores for each data unit indicating the similarity of the data unit to respective said reference data units;

determining an accumulated score for a final state in each of a number of the models by
a) sequentially calculating the accumulated score for a model to reach the final state comprising a leaf in the tree,
b) identifying the closest branch to the leaf corresponding to a next model for which an accumulated score for the final state has not yet been calculated,
c) accumulating the score from the identified closest branch for the next model to the final state,
d) repeating steps (b) and (c) for the branches of the tree, and
e) repeating steps (a) to (d) for the plurality of trees; and identifying at least the item corresponding to the model having the highest accumulated score.

48. A storage device storing computer readable instructions for causing a programmable processing apparatus to perform a method of automatically recognising data comprising sequential data units represented as sequential tokens grouped into a plurality of items, the method comprising the steps of:

storing data representing known items as respective finite state sequence models where each state corresponds to a token and each state comprises a plurality of temporal states corresponding in time to the sequence of tokens;

comparing each sequential data unit with stored reference data units identified by respective reference tokens to generate scores for each data unit indicating the similarity of the data unit to respective said reference data units;

determining accumulated scores for a plurality of temporal states for a final state in the models by accumulating scores for a plurality of temporal states for each state in the model;

storing the accumulated scores for the final state of a model as a group together with information identifying the temporal position of the accumulated scores and information identifying a grouping model state used to arrive at the final state;

reading a previously stored group of accumulated scores;

using said accumulated scores for the plurality of temporal states as a plurality of temporally different initial scores for the calculation of the accumulated scores for the plurality of temporal states of a final state of a model of a subsequent item; and determining the group model state used to arrive at the final state of the model of the subsequent item from the known identity of the subsequent item corresponding to the model and the group model state of the read group of accumulated scores.

* * * * *

UNITED STATES PATENT AND TRADEMARK OFFICE
CERTIFICATE OF CORRECTION

PATENT NO.: 5,983,180

DATED: Nov. 9, 1999

INVENTOR(S): Robinson

It is certified that error appears in the above-identified patent and that said Letters Patent is hereby corrected as shown below:

In column 19, line 19, after "means" delete --,--.

Signed and Sealed this

Twenty-third Day of May, 2000

Attest:

Q. TODD DICKINSON

Attesting Officer

Director of Patents and Trademarks